(12) United States Patent
Luthy

(10) Patent No.: US 11,853,349 B2
(45) Date of Patent: Dec. 26, 2023

(54) SYSTEM AND METHOD FOR AN INTERIOR DESIGN TOOLSET

(71) Applicant: DEZIGNED. LLC, Cedar Knolls, NJ (US)

(72) Inventor: Erik Marshall Luthy, New Vernon, NJ (US)

(73) Assignee: DEZIGNED. LLC, Cedar Knolls, NJ (US)

( * ) Notice: Subject to any disclaimer, the term of this patent is extended or adjusted under 35 U.S.C. 154(b) by 139 days.

(21) Appl. No.: 17/331,587

(22) Filed: May 26, 2021

(65) Prior Publication Data

US 2021/0374175 A1 Dec. 2, 2021

Related U.S. Application Data

(60) Provisional application No. 63/031,135, filed on May 28, 2020.

(51) Int. Cl.

| G06F 16/532 | (2019.01) |
| G06F 16/538 | (2019.01) |
| G06N 20/00 | (2019.01) |
| G06F 111/20 | (2020.01) |
| G06F 30/13 | (2020.01) |
| G06F 111/18 | (2020.01) |

(52) U.S. Cl.
CPC .......... *G06F 16/532* (2019.01); *G06F 16/538* (2019.01); *G06N 20/00* (2019.01); *G06F 30/13* (2020.01); *G06F 2111/18* (2020.01); *G06F 2111/20* (2020.01)

(58) Field of Classification Search
CPC ............................ G06F 16/532; G06F 16/538
See application file for complete search history.

(56) References Cited

U.S. PATENT DOCUMENTS

2009/0138113 A1\* 5/2009 Hoguet .................. G06Q 30/02
                                                                  700/98

\* cited by examiner

*Primary Examiner* — Baoquoc N To
(74) *Attorney, Agent, or Firm* — Greenberg Traurig, LLP

(57) ABSTRACT

Systems and methods for an interior design toolset are provided. The method includes receiving a search query for a first design product from a user; searching a database based on the search query using an artificial intelligence search to identify particular design products related to the first design product; searching the database to identify suggested design products based on data extracted from images of a project area; receiving user input selecting design products from 1) the particular design products and 2) the suggested design products; and displaying three dimensional (3D) models of the selected design products in a projection of the project area.

19 Claims, 17 Drawing Sheets

SYSTEM AND METHOD FOR AN INTERIOR DESIGN TOOLSET

CROSS-REFERENCE TO RELATED APPLICATIONS

This application claims the benefit of U.S. Provisional Application No. 63/031,135, filed May 28, 2020, the disclosure of which is herein incorporated by reference in its entirety.

BACKGROUND OF THE INVENTION

The present disclosure relates generally to interior design, and more particularly to a system encompassing an interior design toolset for design and construction providers and clients.

BRIEF SUMMARY OF THE INVENTION

In accordance with one or more embodiments, systems and methods for an interior design toolset for design are provided. In one embodiment, a computer implemented method is provided, including receiving a search query for a first design product from a user; searching a database based on the search query using an artificial intelligence search to identify particular design products related to the first design product; searching the database to identify suggested design products based on data extracted from images of a project area; receiving user input selecting design products from 1) the particular design products and 2) the suggested design products; and displaying three dimensional (3D) models of the selected design products in a projection of the project area.

In a further embodiment, the search query is an image of a design product.

In yet a further embodiment, the database contains design products from multiple sources.

In yet a further embodiment, the method includes filtering the particular design products and the suggested design products based on category sets.

In yet a further embodiment, the category sets include at least one of: shape, size, material, color, and brand.

In yet a further embodiment, the method includes creating a collection of project ideas using the selected design products.

In yet a further embodiment, the 3D models of the selected design products are displayed in the projection of the project area using augmented reality and computer vision rendering algorithms.

In yet a further embodiment, the design products include at least one of: carpeting, area rugs, vinyl plank flooring, furniture, hardwood flooring, hardwood refinishing, wallpaper, fabric, lighting, window treatments, pillows, tile, countertops, and accessories.

In yet a further embodiment, the method includes matching the user with service providers that install the selected design products based on geographic proximity.

In yet a further embodiment, the method includes scheduling appointments for a selected service provider to install the selected design products using an online calendar based on service provider availability; and updating the online calendar of the selected service provider automatically.

In yet a further embodiment, the method includes generating a notification when the selected service provider is present on an installation site based on a GPS positioning of a service provider device.

In yet a further embodiment, the method includes estimating a cost of a project based on a cost of the selected design products and a cost for a selected service provider to install the selected design products.

In yet a further embodiment, the method includes scanning a project area using an image captured from a camera; measuring various dimensions of the project area based on the captured image; and automatically extracting a position of current items and walls within the project area.

These and other advantages of the present disclosure will be apparent to those of ordinary skill in the art by reference to the following detailed description and the accompanying drawings.

DETAILED DESCRIPTION

Figure 1:
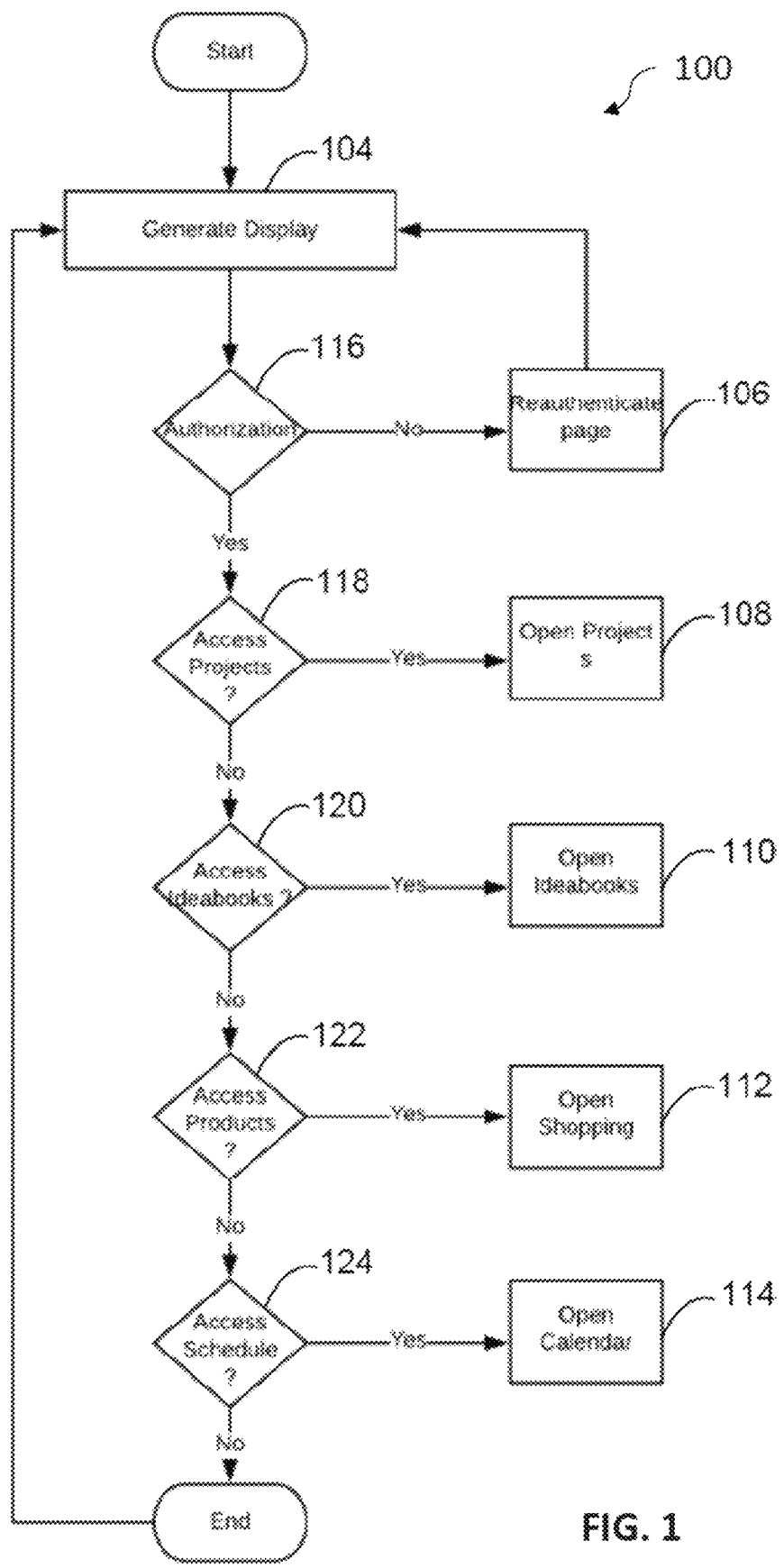
FIG. 1 is a flow diagram of a website portal for access to various components and a workflow of the portal according to an embodiment.

The following is a description of the full steps, procedures, and attributes of the website and mobile app for providing a full service streamlined process for interior design products.

The system includes a website that is built and devised for B to B (business to business). It is primarily intended for the trades, but not so limited. It can be any trade as long as the user has an EIN number. In order to register as a member on the site, the user would have an EIN. He or she must register by inputting company information and details, such as name, location, contact information, and payment information (input a credit card), as well as their EIN. Instantly the EIN number is verified with an API link to a States database. If the information is correct and the EIN is approved, the member is then able to access the site where they will then enter in their username and password.

Presentation Mode and View Mode: Members can access the site either in presentation mode or in view mode. Presentation mode features white labeling and private labeling capabilities.

When a member logs on in presentation mode, the site initially opens up with the member's white labeled logo on it. It also private labels all the products and removes all pricing. This allows members to show the entire site to their customers without revealing all the product details.

The member can then choose to remove presentation mode, and all those details will then be available. All the products include but are not limited to: carpeting, area rugs, vinyl plank flooring, furniture, hardwood flooring, hardwood refinishing, wallpaper, fabric, lighting, window treatments, pillows, tile, countertops, and accessories.

Mill Aggregation: Product feeds are provided from each manufacturer and married into the same form utilizing the present disclosure. The system includes a variety of products from different carpet mills, vinyl plank mills, tile manufacturers, lighting manufacturers, wallpaper manufacturers, hardwood manufacturers, furniture manufacturers, and area rug mills aggregated onto one website. The system is capable of having anywhere from 2 to 5000+ manufacturers for any one particular product and have the search span across every manufacturer within that product and identify the request all in one place.

With the PROJECT-VUE tool, (see PROJECT-VUE in the ATTRIBUTES section below), members are able to create and manage projects from their dashboard. The project management process is broken into 4 steps:

Step 1—Sourcing. The standard design process requires everyone to travel to a showroom. Designers traditionally spend hours sourcing flooring for a project, traveling back and forth between showrooms and flipping through thousands of samples. Showrooms typically have their carpet samples organized either by manufacturer, color, or style. Each of these organizational methods has good attributes, but they don't all service the same need. If a designer is shopping by pattern, for example, then he or she has to look through all the colors. Designers flip through thousands and thousands of samples that don't fit their criteria in order to find the few that do.

The present system reduces sourcing time. Members can source on their phone, tablet, or computer from their home, business, the beach, the bleachers, or anywhere in a matter of seconds. All that's required is access to an internet or other network connection.

Elastic Search: In addition to aggregating the product feeds from a plurality of mills, the present system includes improved search capabilities.

Currently on other flooring websites, such as manufacturers' sites, if a designer searches for "blue stripes," and the product is actually called "midnight" or "sky" and doesn't say "blue stripes" in the description or in the name, the product will not come up. When a member searches blue stripes on the website of the present disclosure, blue stripes come up from every included mill. When a member searches brown vinyl wood-look, brown vinyl wood-look comes up from every included mill.

This is because all product images run through code using artificial intelligence (AI) technology, which pulls out the top three color pixels. Search results are based on the actual attributes of the products and not solely on product descriptions. The software then places the product in a multitude of places within the system, increasing the power of a search.

Members can also filter their searches. If, for example, a member wants blue stripes in a particular fiber, she can narrow down the search by fiber. Then if she wants to limit her search to a particular price point, she can enter that in. All of these can be accomplished in a matter of seconds.

The system also helps members search by suggesting related products. (See SMART-VUE and SUGGEST-VUE in the ATTRIBUTES section below.)

Idea sharing: The IDEA-VUE and DEZIGN-VUE tools allow members to share ideas and get feedback from their customers prior to ordering samples. (See IDEA-VUE and DEZIGN-VUE in ATTRIBUTES.)

With IDEA-VUE, members can save products to an online mood board, which can be shared with their customers. They also have the option to grant their customers limited access to the site, so that their customers can participate in browsing the catalogue and adding products to their project in IDEA-VUE. This limited access features white labeling and private labeling, and these settings may be configured by the member, according to his or her preferences. Also included is a questionnaire, which may be completed by a member's customer as a tool for evaluating customer preferences.

The SMART-VUE interface allows members to search the products maintained in a digital data repository. The interface provides the ability to search the catalogue across manufacturers and suppliers and on a varying set of attributes. Members are given the ability to filter the search results on varying attributes called category sets, like shape, size, material, color, brand, etc.

A search engine is used for maintaining indexed data records and does search query mapping. Each record or data entry is indexed, e.g., using Lucene based index methodology. Any attribute can be selected as filters to narrow down or find products according to the member's needs. This whole process gives high throughput and matching products to the member in milliseconds of time.

The interface shows all of the matched products to the member. The member can either continue to browse through the products or can look at any specific product in detail. Interface uses the auto zooming in and out technology of product images to show the finer details of the product. Interface also provides the suggested or related products to members.

The system also allows members to save search result sets with a temporary URL saved in the system. The system loads this saved URL instantaneously through the memory cache of servers system. Members can resume the search again using back and forth buttons while traversing through products.

Members can add any number of products to one or multiple projects by tagging them to their respective areas of the project. The system saves the mapping in the project area database.

Members can also create a collection of shareable project ideas or mood boards and share with their customers through an interface called IDEA-VUE. The interface may use a temporary secure token URL for external users like customers or members to access the site on web and mobile in a presentation mode only. The system saves the data in the idea board database and fetches whenever needed. Members can view and manage their idea boards and related data.

If a member's customer agrees to the board collection, members can convert the board collection into a real project in the system. The system also scans the feedback and messages from clients and tags them to the idea board in the database. Members can view and act on those feedbacks through the interface. The system makes this whole feedback loop automated and digital by text parsing and data storage in the database.

The system also provides an interface named SUGGEST-VUE that allows the member to see the list of suggested products based on the data extracted from project area's photos. The system uses custom-built technology in the domain of advanced computer vision and graphics to fetch information, like object placing, wall color, etc. Members can access the list of suggested products mapped to each area of the project. Members can view those products in the DESIGN-VUE interface discussed below.

The DESIGN-VUE interface is configured for members and their customers to view the 3D models of products in their real space. This interface uses Augmented Reality and Computer Vision rendering algorithms. Members can enable the link to view the project or idea boards in this interface once products are added to them. Members can view the 3D view of products in Areas in real view using a mobile app. Members can also share the link with customers to view the same on their mobile. Members can switch the products and add or remove products from feedback from their customer to reflect in real time. Users can also drag and drop 3D models of products in view, resize the 3D models and remove them from view.

Members can also request a sample of product to show to their customer or to test themselves. The interface allows members to configure multiple addresses for such order. A sample can be delivered to any one of the multiple addresses configured in the system. The system also sends an auto-generated email notification to the brand's sample order email address configured in the brand database. Business rules can be configured regarding quantity and free sample order placing through the admin interface.

Members may also choose to experiment with products in the space using the DESIGN-VUE tool. The DESIGN-VUE uses Augmented Reality (AR) technology to allow members to select and superimpose products into the actual space by simply taking a picture of the space. This enables the system to identify what is an actual piece of furniture as opposed to what is the floors. Members are able to remove any and all items from the room and replace it with new products including wall colors, flooring, area rugs, raised paneling, coffered ceilings, trim, window treatments, wallpaper and accessories all done in matter of seconds for each choice and it is the actual product rather than a rendering. A 2D image is converted into a 3D image for any product that the system includes pictures of. The member can change, move, or resize products in real-time all to scale of the room to the specifications of each product. This is not a simple rendering, but an actual AR-generated environment. (See DESIGN-VUE in the ATTRIBUTES section below.)

Sampling: Members are able to source the catalogue, and they're able to select samples and put them in their carts. They're also able to order samples through the site.

When a member orders a sample, a direct link is sent to the manufacturer requesting the sample. This is done immediately after any product is requested. The system receives a message back from the manufacturer with an order confirmation and shipping notification.

A member can choose to ship samples to her own residence, her business, her customer's building, or anywhere he or she likes. Once the member receives the samples, she then presents them to her customer to make the selection. When she is ready to proceed to the next step, which is the measuring step, she logs back into the site and accesses her project.

Step 2—Measuring. The system immediately assigns an installer, measurer, service provider and the like. Members are matched with service providers by geographic proximity using zip codes, according to the location of the jobsite. Once a service provider is assigned, the member gains access to the provider's calendar and scheduling. Service providers can be identified based on multiple parameters, such as vicinity to the location of project address, ratings and feedback data inputs. Geolocation coordinates of a web based browser and GPS for mobile based apps may be used to map proximity algorithms. Members can view the verified photos of service providers and feedback on service providers' past work.

The member is presented with an option to schedule appointments at mutually available time slots. The system handles this real time availability and scheduling for both members and service providers. The calendar may be integrated with third party calendars, such Google calendar, Outlook calendar, etc., through an application programming interface. Any booked or scheduled slot is also booked in all of the relevant user calendars. The communication and notification can be handled through a hybrid notification system, using email, messages and web/mobile-based push notifications.

Members and service providers are able to check in through the system when on-site. The check in can be verified through geolocation or GPS coordinates of members and service providers. In an embodiment, the system only allows the process to move forward if the project address geolocation and the coordinates of service provider mobile or web are within an allowed perimeter.

The interface allows members and service providers to match and verify the digital specifications of requests like areas to be serviced, size and shape of product, color of product, etc. while on-site. Service to one or multiple areas or products is provided.

The system provides an interface named PLAN-VUE for service providers to scan the area for measurements. Service providers scan the room with the camera mapped to the interface, and the system automatically extracts the positioning of walls and objects to show the measurement on screen. The system extracts the 3D spatial resolution of the camera frame for all objects like walls and objects inside the room, like furniture, etc. using custom-built technology with computer vision algorithms.

The system is configured for automatic integration and data import from hardware devices, like Bluetooth powered devices. The system fetches the measurements from such tools using laser-based distance measuring techniques. Bluetooth may be used to connect with such devices and uses it for data transfer. Additionally, MQTT protocol devices can be integrated to extract such measurements. Service providers can also manually add or edit the measurements before submitting. The system saves the information in the database and maps it to the project.

The interface shows the estimates and invoice with cost and time effort inclusion to both the member and the service provider. The system creates an invoice automatically and saves it in the database. This invoice and estimate is also used by the system to auto pay the service provider after completion of the project. The system also sends the service provider the measurements and time effort mapped to the project.

Members can review and share the estimate with their customer to get approval. Interfaces allow members to mark the product price as they wish before sharing with their customer. An interface allows the visibility of retail and wholesale price of product. The system allows different ways to share the invoice, like auto-generated email and messages and temporarily secured links to access the invoice in the system. Once approved, members can place the order for the products through the PROJECT-VUE interface.

Dynamic Scheduling: The calendar feature allows members to see their service providers' availability in real time and to schedule appointments instantly online, without having lag time. Members are able to set appointments for measuring or installation in a few clicks. When a member books an appointment, the system automatically updates the service provider's calendar and sends an instant notification to both the service provider and the member confirming the details of the booking. All details are now documented in each project details. In an embodiment, administrator are always granted access as well.

Members can set their own notification preferences, whether they want to be notified by text, phone, and/or email. They are also able to choose the frequency of the reminders they want to receive. Hypothetically, reminders could be 3 days prior to the appointment, 2 days prior, and the morning of. Members will get reminders from the system automatically.

All communication between members and service providers is conducted and tracked through the system's built-in messaging system, so all transactions and communications may be monitored.

Members will be notified when the service provider is on-site. The system uses satellite positioning tracking (e.g., GPS) to verify providers' locations.

The members checks in online when he or she arrives at the site as well. This is also confirmed by GPS.

The member then meets the service provider at the jobsite. The provider will present documentation that shows details of the request. This documentation will correspond to a form filled out by the designer upon scheduling. It will include specifications of the request, such as the area to be serviced, the product, the pattern, the size, the color. It can be for multiple areas and multiple products according to the needs of the job.

Once the member confirms the accuracy of the details, the service provider can confirm, e.g., by sending a confirmation through a mobile application, that they are ready to start the job.

The PLAN-VUE feature (see PLAN-VUE in ATTRIBUTES below), allows service providers to instantly scan and measure a space using their mobile device, with accuracy down to a 32nd of an inch. The system automatically calculates the cost of the job and generates an invoice for the full-service of the job, including product and installation costs. This invoice is uploaded into the system and provided to the member. In an embodiment, this can also generate a service estimate separately to notify the system, as well as a service provider, what the expected fee will be to complete the project. The estimate information is stored and in an embodiment the system is configured to disburse payments automatically into the service provider's bank account after the project is completed. The cost of goods and the cost for the service may also be stored and utilized for analytics to show the percentages of which products are being sold and what the associated job costs are. The service member can also specify how long the service will take so that all parties are aware of when they must be present to perform their various tasks. The member must be present at time of commencement and completion of the project.

The member then provides an estimate to her client and can mark up the price as she wishes. The website displays both retail and wholesale pricing. The member then provides her pricing to her customer. Once her customer accepts the product and the pricing, the member returns to the website to place the order.

In an embodiment, each member and service provider can rate each other on every measurement and installation. This can be made to be anonymous.

Step 3—Ordering. When a member confirms her order, a payment is made, e.g., her credit card is charged for 100% of the project and an email notification goes out to the manufacturer placing the order for goods. The system also automatically generates an email to the service provider, letting him know that a job has been awarded.

Payment and checkout process can employ secure industry standards technologies like PCI compliance and encrypted data transfer. Different modes of payments may be used, such as credit cards, auto sweep, debit cards, bank transfers etc. The system is integrated with third party payment gateway tools in a secure way and may employ SSL enabled HTTPS protocol to transfer data and information back and forth with these tools using a strong AES encryption cryptography.

The manufacturer sends an email confirmation through the system with shipping information and an estimated date of delivery. The system automatically forwards this information to the service provider. The system also notifies the designer that the goods are being shipped, and she will be notified again when they are received at the warehouse.

Once a member confirms the order, system sends a check for the availability of product in stock through digital handshake with EDIs of manufacturer and suppliers. If stock is available, the system triggers an automatic checkout flow. The system notifies the member when availability is confirmed or denied. The system updates the same in order database.

When the material is received at the warehouse, the service provider opens up the website, navigates to that specific job, and confirms that the goods received match what was ordered. There is a checklist he must complete on the website, which requires the service provider to confirm the specs of the order, such as the proper material, the proper size, and the proper color. Once it is confirmed that all is correct, the service provider confirms as such, e.g., through a mobile app.

In an embodiment, the members to check the status and stage of their product and order movement. The system provides an interface with well-defined order tracking workflow for members and is integrated with different delivery platforms to track the orders in real-time. It can also notify the service provider of estimated delivery through email, messages and push notifications.

Once a product order is received successfully at the warehouse then the system notifies the service provider through email and messages. The interface allows service providers to update the digital inspection checklist of products on varying attributes like shape, size, color and condition of order. If the checklist passes, the system notifies the members and the project is auto transitioned to the next stage.

Step 4—Installing. At their convenience, members can log back into the website and schedule their installation. Installation uses the same dynamic scheduling capabilities as the measuring step discussed above. The member books through the calendar feature, and the same reminders and notifications are sent out, according to member preferences, leading up to the appointment.

The system generates a notification when the installer is on site. The member checks in through the website as well when she is at the job-site. All are GPS tracked.

The installer presents the same form that the member had filled out initially requesting the measurement. This is to ensure continuity and no confusion. The member confirms the product, the size, the color, and all the details. The installer returns to the website and clicks accept. Then he provides the installation.

The member should be present at the commencement and completion of a job. As a courtesy, the system provides the member with a time estimate of how long the installation will take. Thus, if it is estimated to be an 8 hour job, the member can be notified to come back at the appropriate time.

Members can schedule installation for a project through the PROJECT-VUE interface. The interface allows the member to schedule appointments at mutual available time slots. As discussed herein, the system handles this real time availability and scheduling for both members and service providers, and may be integrated with third party calendars, such as Google calendar, Outlook calendar, and the like, e.g., through an application programming interface. Any booked or scheduled slot is also booked in all of their calendars. The system handles the communication and notification through a custom-built hybrid notification system using email, messages and web/mobile based push notifications.

As discussed above, the interface allows members and service providers to check in through the system when on-site. The system verifies the check-in through geo location or GPS coordinates of members and service providers.

The interface allows members and service providers to match and verify the digital specifications of requests, such as areas to be serviced, size and shape of product, color of product, etc., while on-site. The interface allows service providers to install one or multiple products.

The service provider then completes the digital checklist of the post-installation process. Once a member is notified, they can verify on-site and complete the same digital checklist at their end. The interface allows both member and service provider to mark projects done once both checklists are verified and completed. The system also triggers automatic payment to service provider accounts after this step.

Once the job is completed, the member is either already on-site or returns to the job-site. The installer reviews the post-job checklist and verifies that he has completed all the proper steps. For example, he confirms that he has walked the job, inspected and approved the work. The member walks the job site as well and completes a similar checklist. Once completed, they both click accept, and the job is marked as completed.

Rating System: In an embodiment, the rating tool includes a questionnaire about professionalism and timeliness. Service providers and members may be incentivized to maintain a 5-star rating, and this may include monetary and non-monetary incentives.

Attributes of the System

PROJECT-VUE: Project-Vue provides an interface for members to organize their projects and data. Members create "projects," which allow them to store and manage work by job, by customer, by space, by theme, or by any other designation of their choosing.

From their dashboard, members can see and access all of their saved projects. Users can use Project-Vue to save work related to a specific project or job in that project folder. They can access their projects at any time, and they can manage the process for each specific project—sourcing, measuring, ordering, installing—from there.

In an embodiment, Project-Vue can be integrated with a third-party system or software, e.g., Fohlio.

SUGGEST-VUE: Suggest-Vue provides an interface for users to create a design plan and to choose products for a specific space based on factors like color scheme or other objects in the space.

The interface provides users with automatic product suggestions based on the real view of customers' spaces using data, such as photos, provided by the user.

Suggest-Vue uses Artificial Intelligence to suggest products based on the ambience, colors, etc. of the space.

SMART-VUE: Smart-Vue provides an intelligent search system for members to find products quickly and easily. The interface enables users to search for products based on various factors, such as color, size, shape, material, brand etc. Smart-Vue also helps designers search by generating suggestions of related products.

Smart-Vue is powered by an elastic search system, as discussed further below and AI.

IDEA-VUE—Idea-Vue allows members to save products in a mood board and share them with clients. The member is able to grant her customers access to the website in presentation mode. By using presentation mode, members are able to control what their clients see and how much access they have. This includes private labeling and white labeling capabilities.

Through Idea-Vue, the members' customers are able to help with sourcing by browsing the catalogue and adding products to an ideabook, an online mood board created by the member for a specific project.

The system can also be configured to provide a questionnaire for members' customers to fill out to help expedite the process. The questionnaire evaluates customer preferences, such as color, pattern, and style.

DESIGN-VUE—Should they have a photo of the space or if the end user can provide a photo of the space, members are able to select products and superimpose them into the space using augmented reality (AR) technology.

As the member selects products, she can put them into DESIGN-VUE. Design-Vue allows members to superimpose products from the website onto a photo of any area. Members can switch products, change the placement of products in the room, and change the size of products.

Using Design-Vue, members can share their selections with the end user and give their customers a visual of how the product will look in their space, prior to ordering, delivering, or presenting any samples. This cuts down on travel time, wasted visits, and minimizes the chances of ordering the wrong products.

PLAN-VUE: When the service provider starts the job, the system opens up a measuring tool and capability, called Plan-Vue. Plan-Vue allows providers to scan a room using their device and take measurements, e.g., down to a 32nd of an inch. Using the specs from this scan and the product prices that are already in the system, the cost for the services to complete the project can be estimated and relayed in full to the client.

In an embodiment, services are also pre-priced in the system. Once the provider FIGURES out which services are required to perform the job, he inputs this information, the system adds this to the total cost and instantly generates an invoice for the job. The member instantly knows the cost for the job itself, including full-service, product and installation.

The system will immediately generate the cost for the installation with the cost of the material and the mark up assigned to each user. This number is then presented to the user. The system also separates the material and installation cost. This is done so the service provider will be automatically paid within set terms when the project is completed. The system also is configured to track when material is shipped from the supplier and the system can be set to automatically pay the supplier, e.g., 29 days after the material has been shipped to stay within the 30 day terms.

The system also able to provide 2D and 3D renderings of the space. The system will also instantly provide a seam layout, should the project include wall-to-wall carpeting. Seem layouts can be edited and reconfigured according to member's preferences.

This system may be configured to generate invoices for service providers as well, so they can see exactly how much they will be earning on each job. This simplifies the accounting. The system saves and catalogues all invoices for maximum transparency and accountability.

The system allows businesses to register or enroll using a digital form on the web and mobile interface. Business/member provides information like name, email, phone number, EIN number, etc., to the system. The system saves this information in the member user database schema.

In an embodiment, an EIN number is mandatory for users to register. The system checks the EIN number with the relevant states database through an application interface. If it's verified, the user is notified through system generated notifications like emails and text messages. The user is then sent an auto generated secure and strong password to access the system.

The system also allows the service provider to register using a digital form on web and mobile. The system captures the data, like name, email and phone number. User is then sent an auto generated, secure and strong password to access the system.

Business and service members can also register with social media accounts, such as Facebook, Google and LinkedIn. The system is configured to automatically pull profile data, like name, email and phone number through these social media accounts as soon as the user allows the access. In an embodiment an OAuth 2.0 handshake process is perform to verify the exchange of information to verify social media accounts.

Once registration is completed and verified, the system provides an onboarding interface to members and service providers. Users are provided a digital on-boarding walk through process on the web and mobile interface of the system.

In the process, the system captures relevant data, like address, schedule, profile information, etc. and stores them in the user database. The interface allows users to upload a photo of themselves. Users can also integrate their third party calendars, like Google calendar, Outlook calendar, etc. to the system using OAuth 2.0 and REST API's. The system uses this for dynamic scheduling and for consistent updating everywhere.

A user is given a secure token every time he/she logs in to maintain the active session to access information and interact with the system. In an embodiment, the system uses a Java web toolkit-based access and time limited tokens for every user.

The system uses secure SSL/TLS for all communication and transfer of data between the user machine and the database. All communication and data exchange use secure AES enabled HTTPS protocol.

The system interface allows the users to log in to the system with a username and password. The system verifies the credentials with the user database and if verified, the system internally allocates a secure active token to the user machine to start accessing the web and mobile interface. If failed, the user is prompted to input the correct credentials. The system also allows users to reset or receive credentials via email if forgotten.

Members can then access the system in two modes—presentation and view mode, they can always switch between modes in the system through configuration and pricing plans. The system maintains the dynamic configuration of features to show in presentation mode through a configuration database.

The system provides an interface for an internal administrator to control various configuration settings. The system provides an interface to service providers also, wherein they can access and keep track of their schedule, projects etc.

When members access the system in presentation mode, the system shows the configurable private labelling techniques, like showing the member logo and hiding the price of products from the view. This allows the members to share/show the system with their clients with a web or mobile URL through digital notifications like email or message. The entire system is then perceived as belonging to the member. The system can be shared with the client (e.g., an end user) where only specified details are shown. Clients can then click on those viewable links and access the presentation view. The system hides a secure token which is specific to every member, to ensure the link accessed is valid and is a presentation view link. The system keeps such links mapped to every member in the database and uses advanced cryptography techniques to create such secure token links.

When members access the system in normal view, the system provides different interfaces like PROJECT-VUE, PLAN-VUE, SUGGEST-VUE, DESIGN-VUE, IDEA-VUE, SMART-VUE for members to access all available features and details.

The system maintains an updated data collection of products from mills, like carpet mills, vinyl mills, or any relevant mill. It need not be limited to any specific product line or industry. The system has a separate automated interface to consume the data feeds from these. The system uses custom built data adaptors and modules to consume feeds in varying data formats like XML, flat files, input/output stream and web crawling data. In an embodiment, the system uses custom-built parsers for CSV, XML, TXT and XLS file reading and processing. The system also maintains a drop zone FTP server where suppliers can drop files to trigger the process automatically.

The system passes unstructured or semi-structured data into a data optimization module using custom build tools, such as date formatting module, image resizing module, price calculator module, brand or supplier configurable module, and the like. This interface then parses every entry of data and structures them according to the needs of the system. The system is configured to apply Artificial Intelligence to cluster the colors of products into a high-level color family. The system uses a scalable collection of tech modules to auto-size the source images into different optimal levels for web and mobile screens.

The system has an interface with custom-built technology to upload these products and tag them to respective manufacturers, brands, suppliers and other configurational sets called categories to provide smart search. The interface has built-in support for creating this set, called a category, on different attributes of data feed like color, size, shape, price, brand, pattern and the like.

The system may be configured to automatically start creating a 3D virtual view of the product, using the images uploaded. Artificial Intelligence and Computer Vision technologies are implemented to convert photos into a 3D view of every product.

The system passes each image into a tech modules pipeline. In the first step, a virtual normal map is created for a 2D image by extracting its light direction view and combining all the light direction views to create a map. The image is then passed to the next step, where the normal map of the image is processed and converted into a heightmap maintaining the correct aspect ratio. In the final step, a 3D mesh of the height map is created and stored on the cloud servers. The product may be associated with the configuration of the 3D mesh stored path.

The system automatically checks data streams of various supplied to ensure the inventory is updated with the latest stock quantity of each and every product of the data repository.

The system provides the PROJECT-VUE interface, discussed above, for members to manage the complete lifecycle of their work items for clients. The interface allows a member to create an entry in the system database of a new client or use any of their existing clients for creating a new project or work item for them.

The members are provided an interface to view and manage their list of clients. Members are also provided an interface to view and manage their list of projects. The members add data for projects like name, description, address, pictures etc., through the interface and system store these information in the project database. The system provides a unique UUID for every project.

The interface provides the ability for members to add a collection of data to projects for a single or multiple rooms. This collection of data from rooms or rooms is referred to as an "area". Members can then add photos of the room and store in the system.

A 3D virtual view of the project and Areas is created using the images uploaded. The system uses Artificial Intelligence and Computer Vision technologies to convert photos into a 3D view of every area, as discussed herein.

The system provides an interface for members to clone or archive projects. When a member clones an existing project, the system creates a new project with all the details of the reference project and assigns a new UUID for the project. Members can archive a project which is not active, the system does all the checks in background to ensure the project is not in any active stage before archiving.

FIG. 1 is a flow diagram 100 of a website portal for access to various components and a workflow of the portal of the present disclosure according to an embodiment. An initial display is generated at step 104. Authorization is checked at step 116. If unsuccessful, at step 106 the page is reauthenticated and control passes back to step 104. If authorization is successful, then it is determined at step 118 access to projects is granted. If yes, then projects are opened in step 108. If project access is not granted, it is then determined at step 120 if there is access to ideabooks 120. If yes, then ideabooks are opened in step 110. If access to ideabooks is not granted, it is determined at step 122 if there is access to products. If yes, then shopping is opened at step 112. If access to products is not granted, then it is determined at step 124 if there is access to schedule. If yes, then a calendar is opened at step 114. If not, the process is terminated and returned to step 104.

Figure 2:
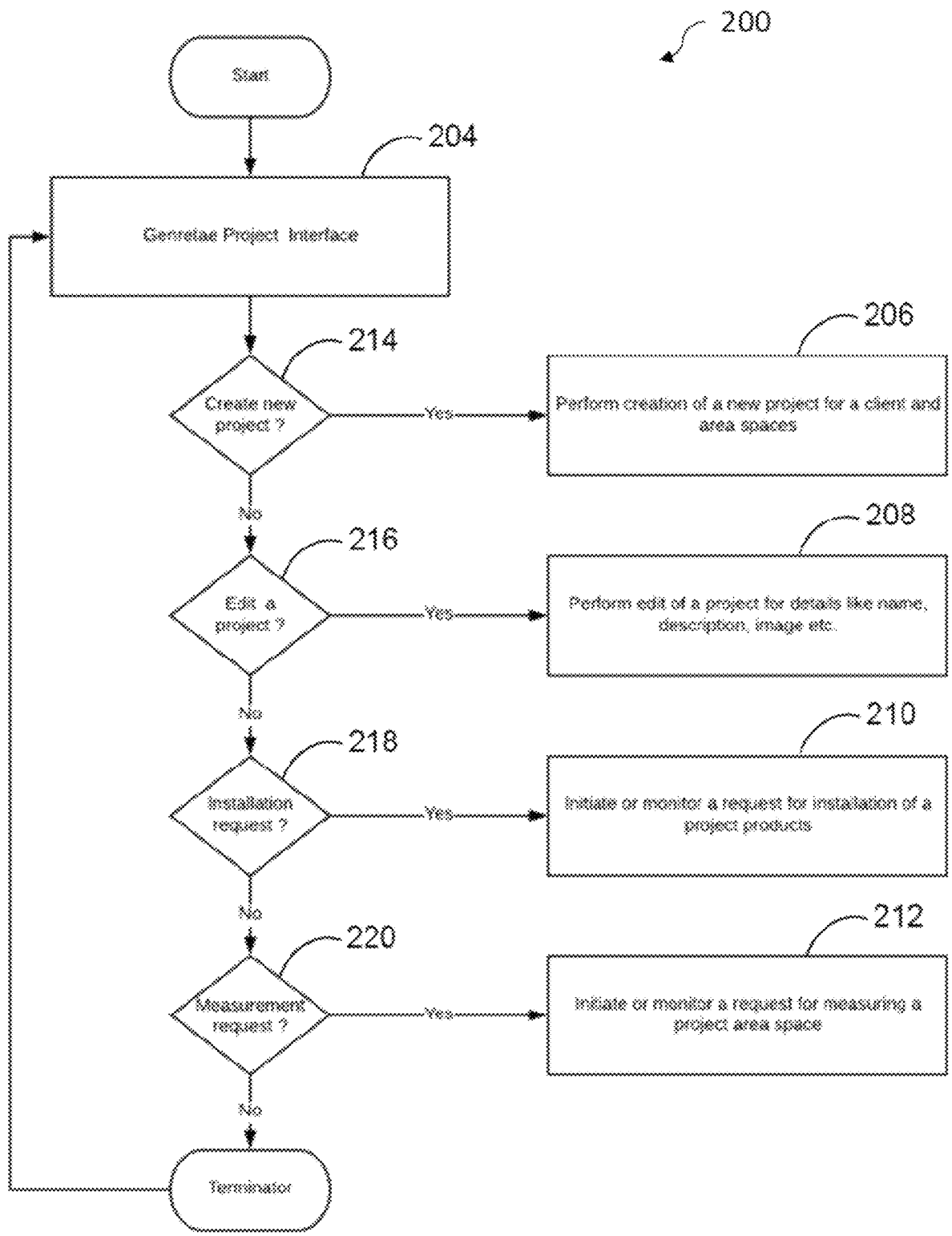
FIG. 2 is a flow diagram of the process to create and manage projects according to an embodiment.

FIG. 2 is a flow diagram 200 of the process to create and manage projects of the present disclosure according to an embodiment. A project interface is generated at step 204. At step 214 it is determined whether to create a new project. If yes, a new project for a client and area spaces is created at step 206. If not, it is determined at step 216 whether to edit a project 216. If yes, project details such as the name, description, or images associated with the project are edited at step 208. If editing a project is not selected, it is determined whether an installation request is selected at step 218. If yes, a request for installation of a project products is initiated or monitored at step 210. If an installation request is not selected, it is determined whether a measurement request is selected at step 220. If yes, a request for measuring a project area space is initiated or monitored at step 212. If a measurement request is not requested, then the process is terminated and returned to step 204.

Figure 3:
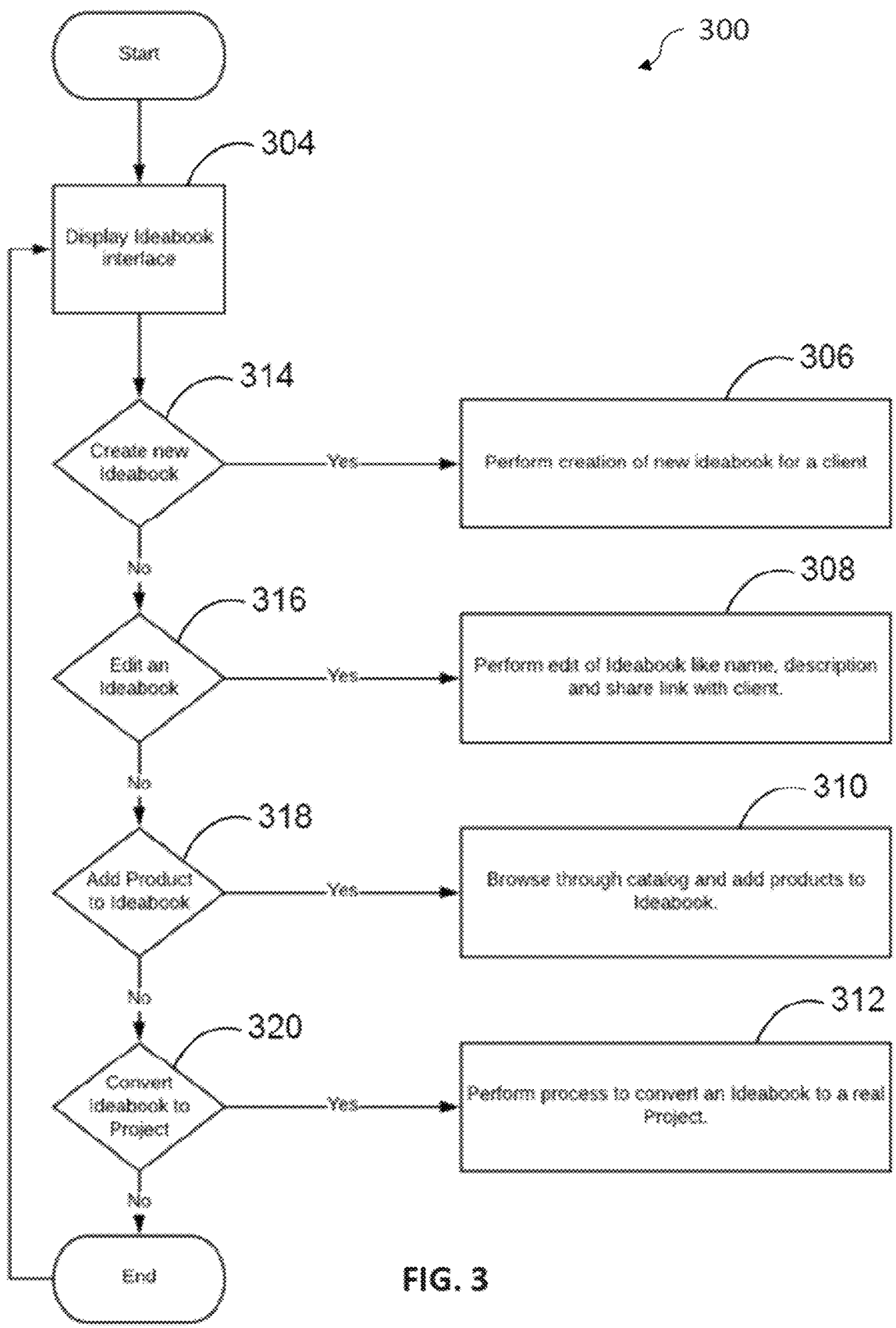
FIG. 3 is a flow diagram of the process to create and manage idea books according to an embodiment.

FIG. 3 is a flow diagram 300 of the process to create and manage idea books in accordance with the present disclosure. An ideabook interface is displayed at step 304. At step 314 it is determined whether to create a new ideabook. If yes, creation of a new ideabook for a client is performed at step 306. If not, it is determined whether to edit an ideabook at step 316. If yes, an edit of ideabook details such as the name or a description of the ideabook is performed, and a link is shared with the client at step 308. If not, it is determined whether to add a product to the ideabook at step 318. If yes, at step 310 a catalog is browsed, and products added to the ideabook. If not, it is determined if the ideabook is to be converted to a project at step 320. If yes, a process to convert the ideabook to a real project is performed at step 312. If not, the process is terminated and returned to step 304.

Figure 4:
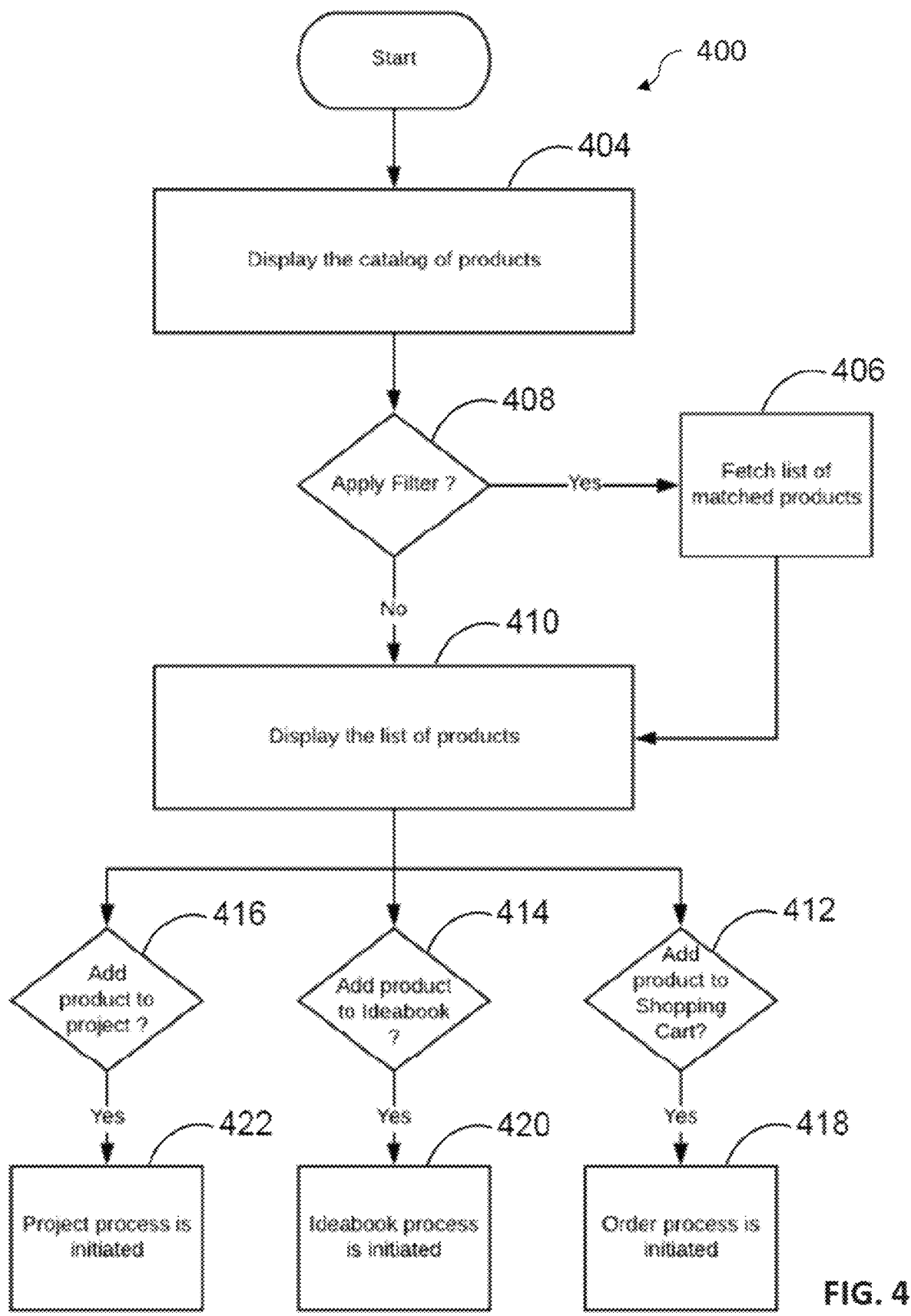
FIG. 4 is a flow diagram of the process to browse and order products from the system catalogues according to an embodiment.

FIG. 4 is a flow diagram 400 of the process to browse and order products from the system catalogues according to an embodiment. A catalog of products is displayed at step 404. It is determined if a filter is applied at step 408. If yes, a list of matched products is fetched at step 406 and the list of products is displayed at step 410. If no filter is applied, the list of products is displayed at step 410. At step 416 it is determined whether to add a product to a project. If yes, a project process is initiated at step 422. At step 414, it is determined whether to add a product to an ideabook. If yes, an ideabook process is initiated at step 420. At step 412, it is determined whether to add a product to a shopping cart. If yes, an order process in initiated at step 418.

Figure 5:
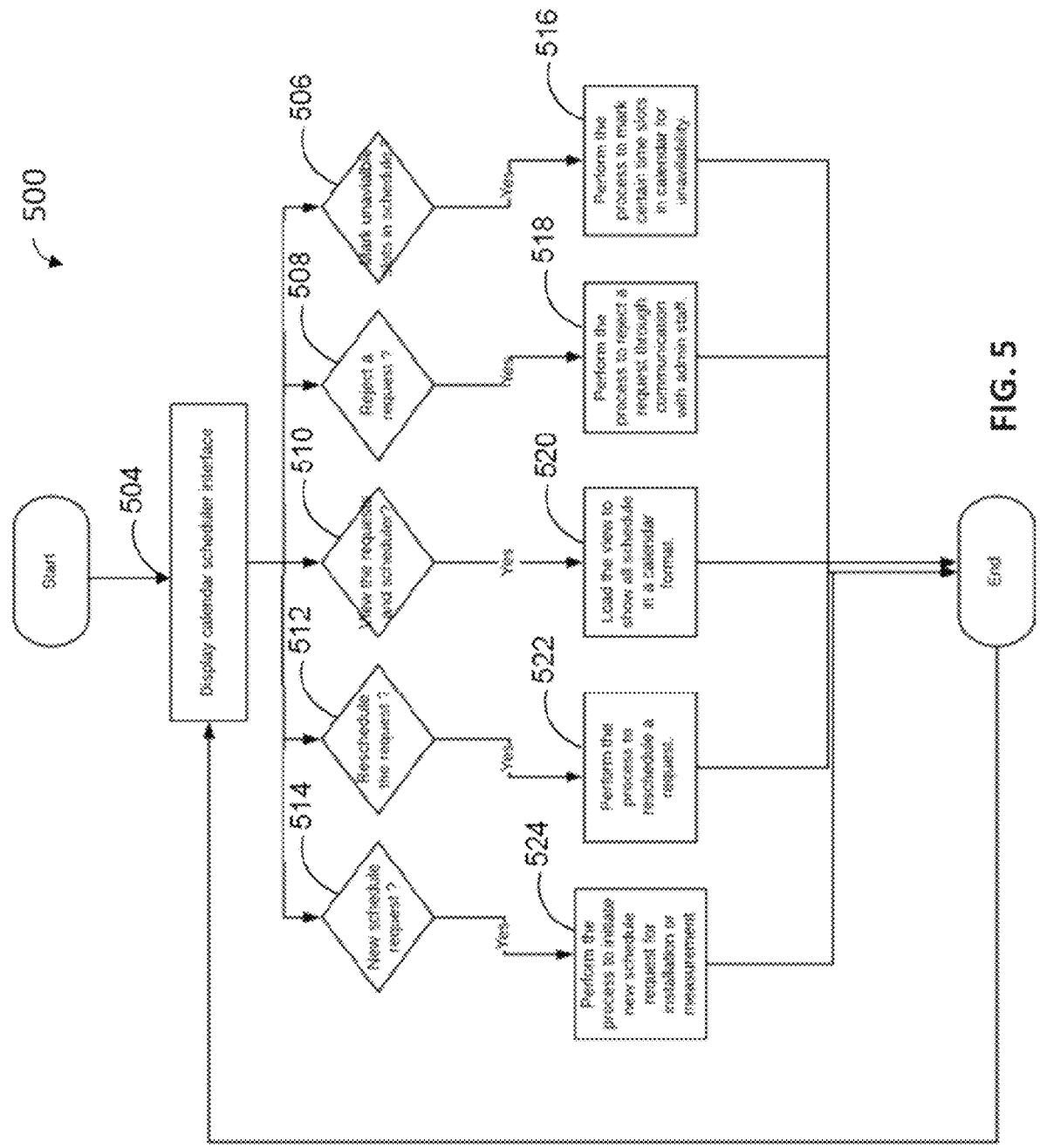
FIG. 5 is a flow diagram of the process to schedule and manage service provider requests for installation and measurement according to an embodiment.

FIG. 5 is a flow diagram 500 of the process to schedule and manage service provider requests for installation and measurement according to an embodiment. A calendar scheduler interface is displayed at step 504. At step 514, it is determined whether a new schedule is requested. If yes, a process to initiate a new schedule request for installation or measurement is performed at step 524. At step 512, it is determined whether to reschedule a request. If yes, a process to reschedule the request is performed at step 522. At step 510, it is determined whether to view the requests and the scheduler. If yes, a view to show all schedules in a calendar format is loaded at step 520. At step 508, it is determined whether to reject a request. If yes, a process to reject a request through communication with admin staff is performed at step 518. At step 506, it is determined whether to mark unavailable slots in a schedule. If yes, a process to mark certain time slots in the calendar for unavailability is performed at step 516. After each of steps 516, 528, 520, 522, and 524, the process is terminated at returned to the calendar scheduler interface display at step 504.

Figure 6:
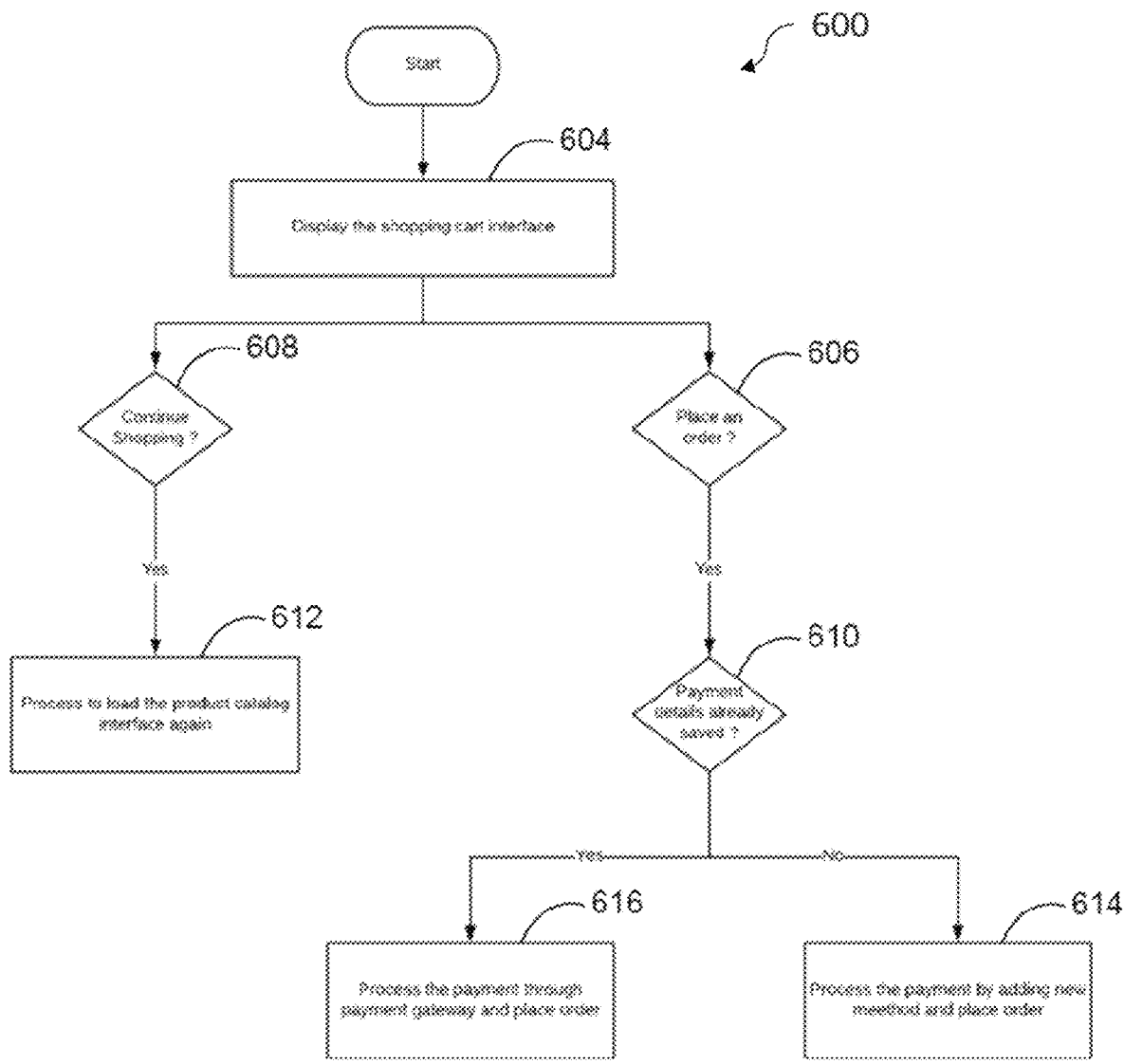
FIG. 6 is a flow diagram of the process to pay for an order through integrated payment gateways according to an embodiment.

FIG. 6 is a flow diagram 600 of the process to pay for an order through integrated payment gateways according to an embodiment. At step 604, a shopping cart interface is displayed, and it is determined whether to continue shopping at step 608 or place an order at step 606. If it is determined to continue shopping at step 608, a process to load the product catalog interface is performed at step 612. If it is determined to place an order at step 606, it is further determined whether payment details are already saved at step 610. If yes, the payment is processed through a payment gateway and the order is placed at step 616. If not, the payment is processed by adding a new method and the order is placed at step 614.

Figure 7:
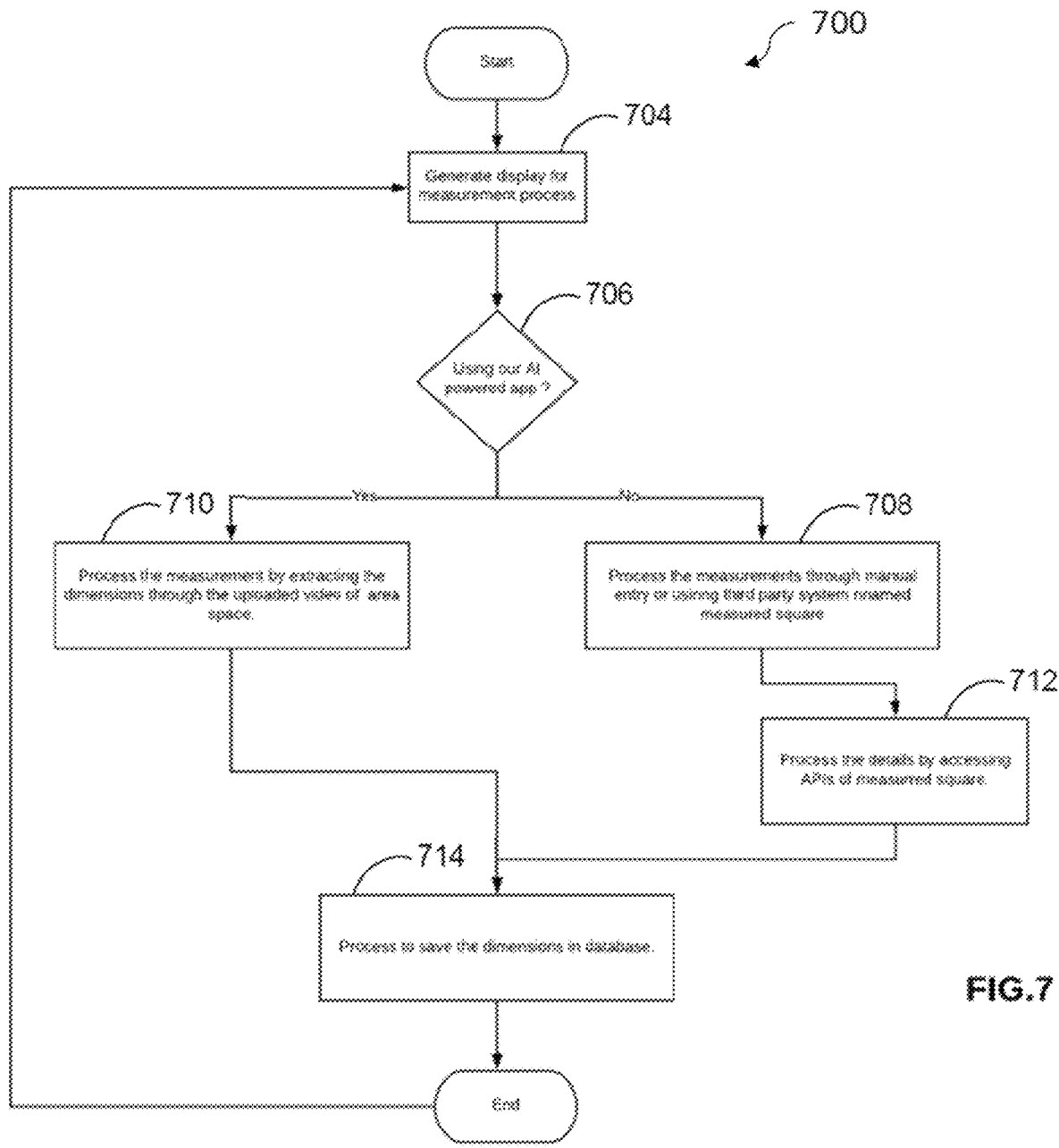
FIG. 7 is a flow diagram of the process to measure the area space of customers using an AI backed solution according to an embodiment.

FIG. 7 is a flow diagram 700 of the process to measure the area space of customers using an AI backed solution according to an embodiment. At step 704, a display for measurement process is generated. At step 706, it is determined whether an AI powered app is being used. If yes, the measurement is processed by extracting the dimensions through the uploaded video of area space at step 710, and the process continues at step 714. If not, the measurement is processed through manual entry or by using a third party system (e.g., measured square) at step 708, the details are processed by accessing APIs of the of the third party system (e.g., measured square) at step 712, and the process continues at step 714. At step 714, a process to save the dimensions in a database is performed, and the process is terminated and returned to step 704.

Figure 8:
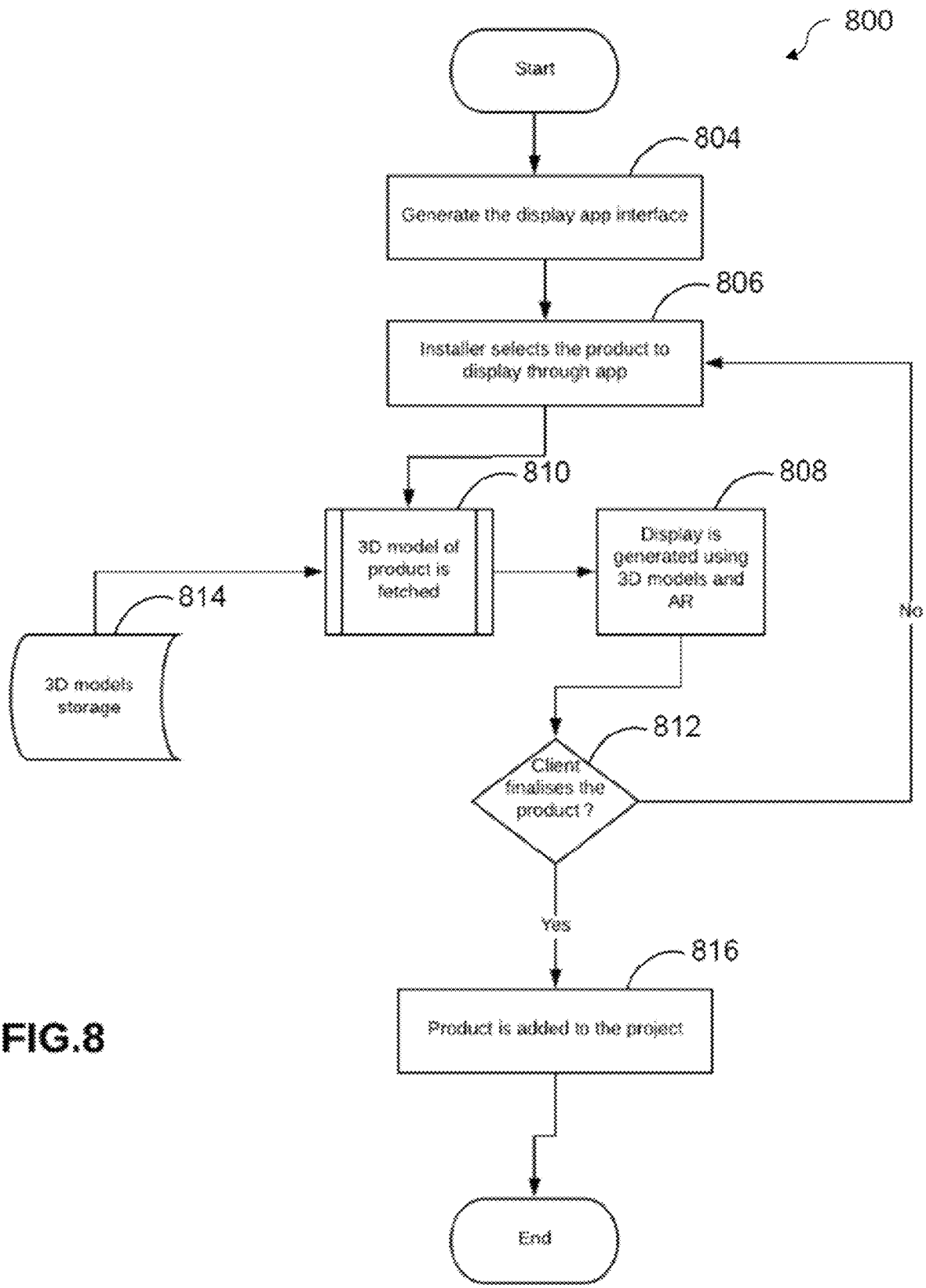
FIG. 8 is a flow diagram of the process to show 3D models in the customer's area space live through a mobile interface according to an embodiment.

FIG. 8 is a flow diagram 800 of the process to show 3D models in the customer's area space live through a mobile interface according to an embodiment. At step 804, a display app interface is generated. At step 806, an installer selects a product to display through the app. At step 810, a 3D model of the product is fetched from a 3D models storage at step 814. A display is then generated using the 3D models and AR at step 808. At step 812, it is determined whether a client finalizes the product. If not, the control returns to step 806. If yes, the product is added to the project at step 816, and the process ends.

Figure 9:
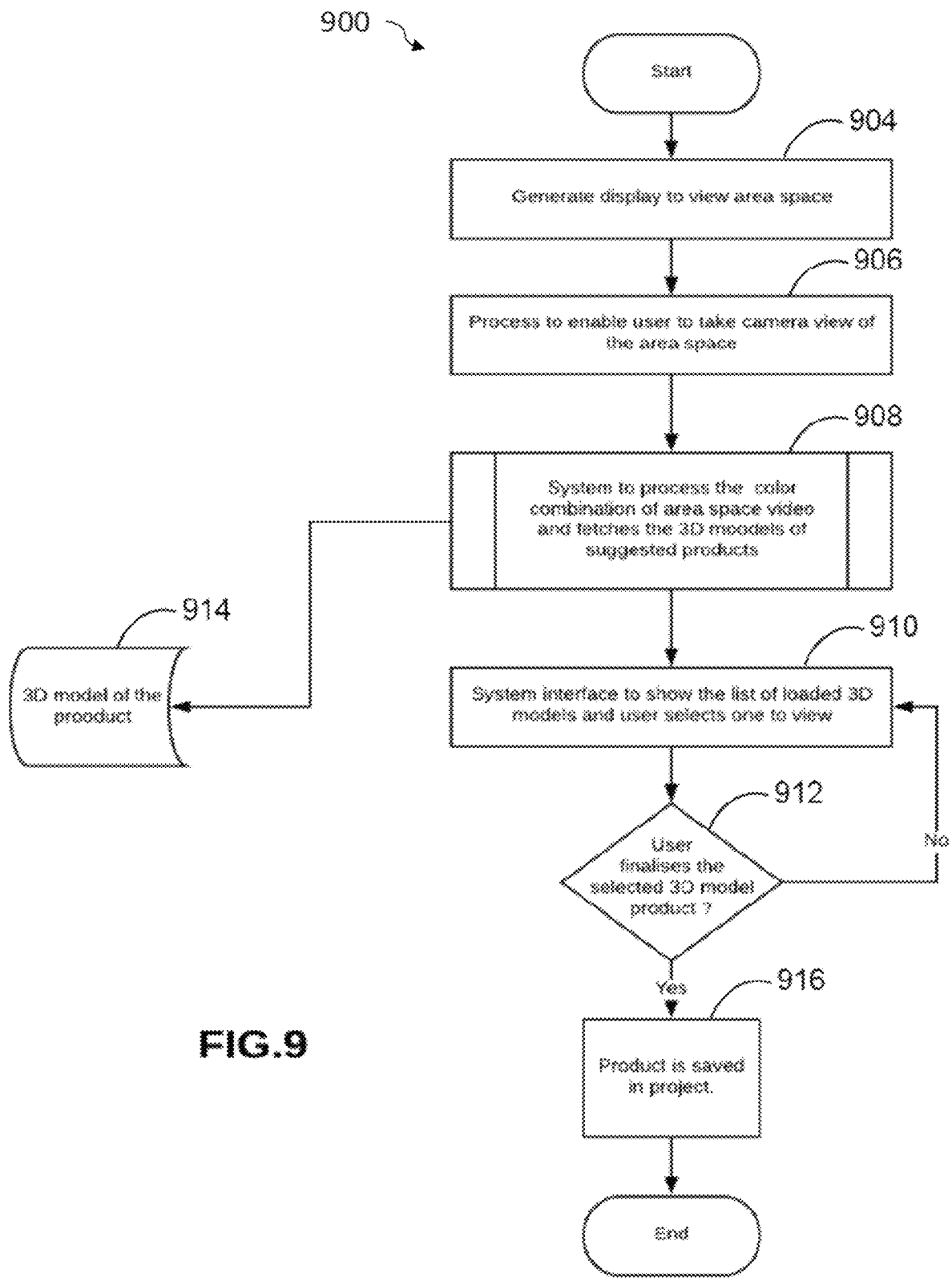
FIG. 9 is a flow diagram of the process of collecting area space measurements using a camera phone through an artificial intelligence (AI) backed system according to an embodiment.

FIG. 9 is a flow diagram 900 of the process of collecting area space measurements using a camera phone through an artificial intelligence (AI) backed system according to an embodiment. At step 904, a display to view area space is generated. At step 906, a process to enable a user to take a camera view of the area space is performed. Control then passes to a system 908 processes the color combination of area space video and fetches the 3D models of suggested products from 3D model of the product 914. The process continues at step 910, where a system interface shows the list of loaded 3D models and a user selects one to view. At step 912, it is determined whether a user finalizes the selected 3D model product. If not, control returns to step 910. If yes, the product is saved in the project at step 916, and the process ends.

Figure 10:
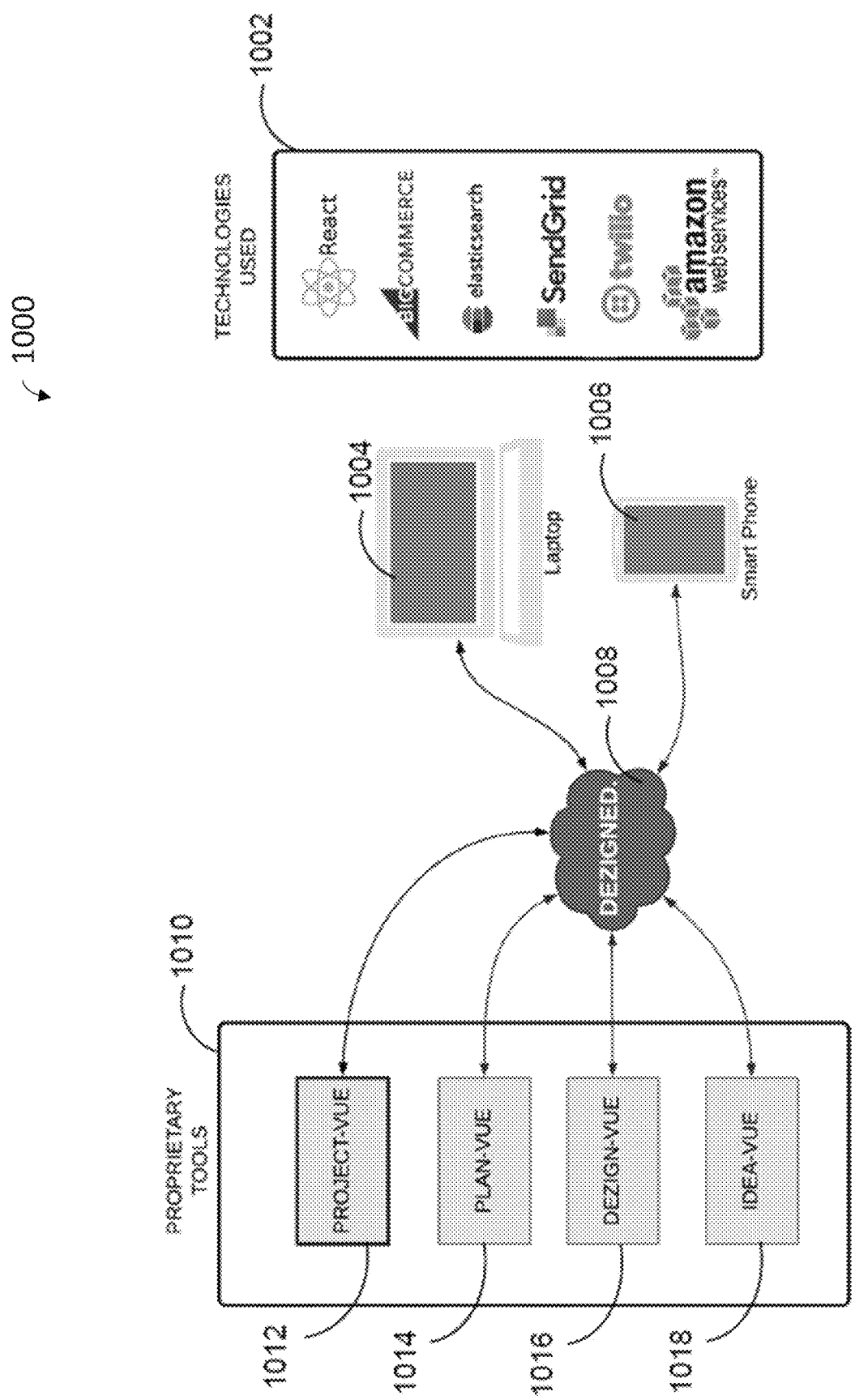
FIG. 10 is a network diagram of interconnected modules and systems of the present disclosure according to an embodiment.

FIG. 10 is a network diagram 1000 of interconnected modules and systems of the present disclosure according to an embodiment. The network diagram 1000 shows proprietary tools 1010 of the present disclosure, including Project-Vue 1012, Plan-Vue 1014, Dezign-Vue 1016, and Idea-Vue 1018. The proprietary tools 1010 are in communication with the Dezigned cloud 1008. Devices such as a laptop 1004 and a smart phone 1006 are also in communication with Dezigned cloud 1008. Technologies used 1002 in the present disclosure may include React, BigCommerce, elasticsearch, SendGrid, twilio, and Amazon Web Services (AWS).

Figure 11:
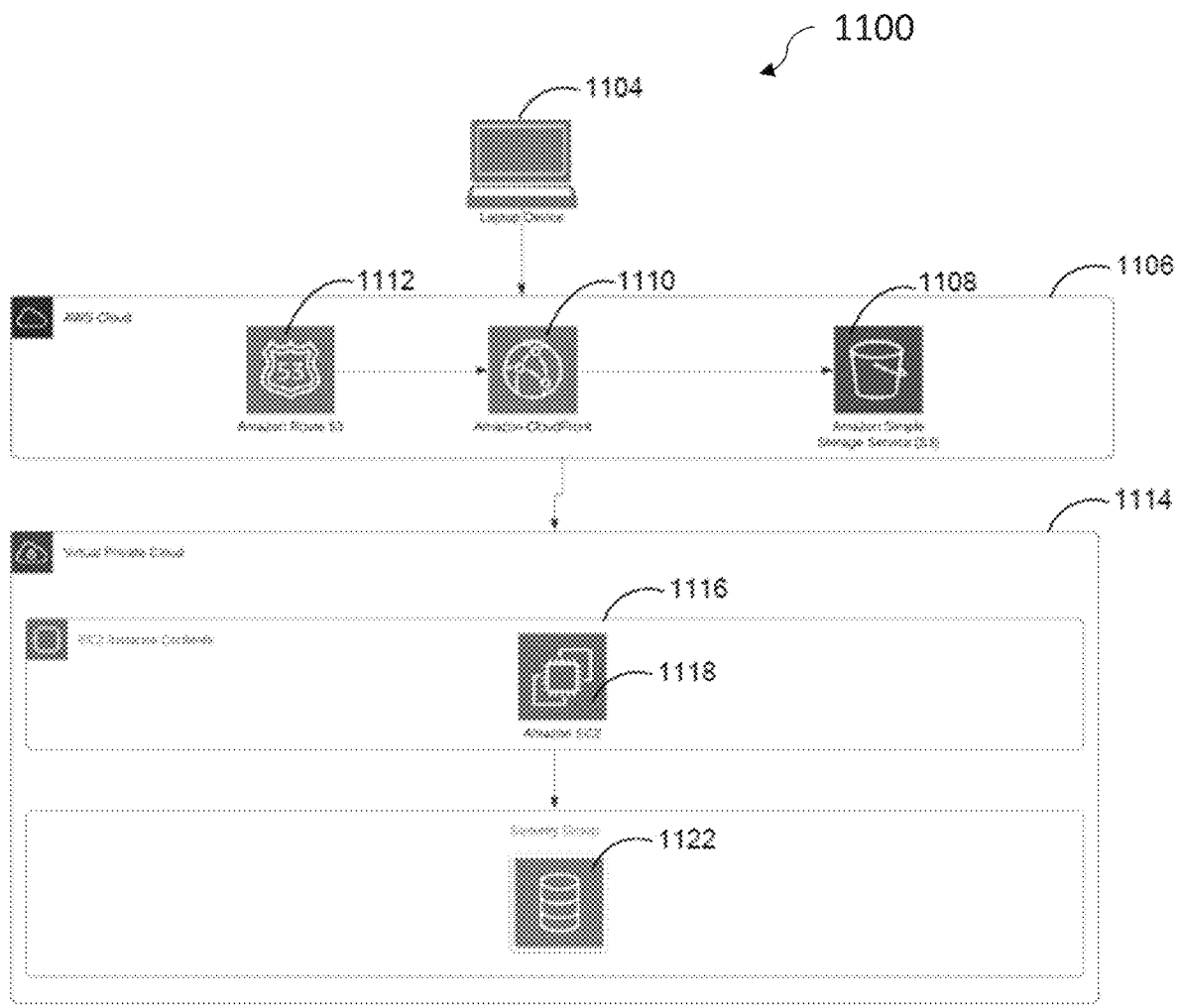
FIG. 11 is a network diagram of servers and computer infrastructure used by the present disclosure according to an embodiment.

FIG. 11 is a network diagram 1100 of servers and computer infrastructure used by the present disclosure according to an embodiment. The network diagram 1100 shows laptop device 1104, connected to an AWS cloud 1106, which includes Amazon Route 53 1112, Amazon CloudFront 1110, and Amazon Simple Storage Service (S3) 1108. AWS cloud 1106 is in communication with Virtual Private Cloud 1114. Virtual Private Cloud 1114 includes EC2 Instance Contents 1116 and security group 1122. EC2 Instance Contents 1116 includes Amazon EC2 1118. EC2 Instance Contents 1116 is in communication with security group 1122.

Figure 12:
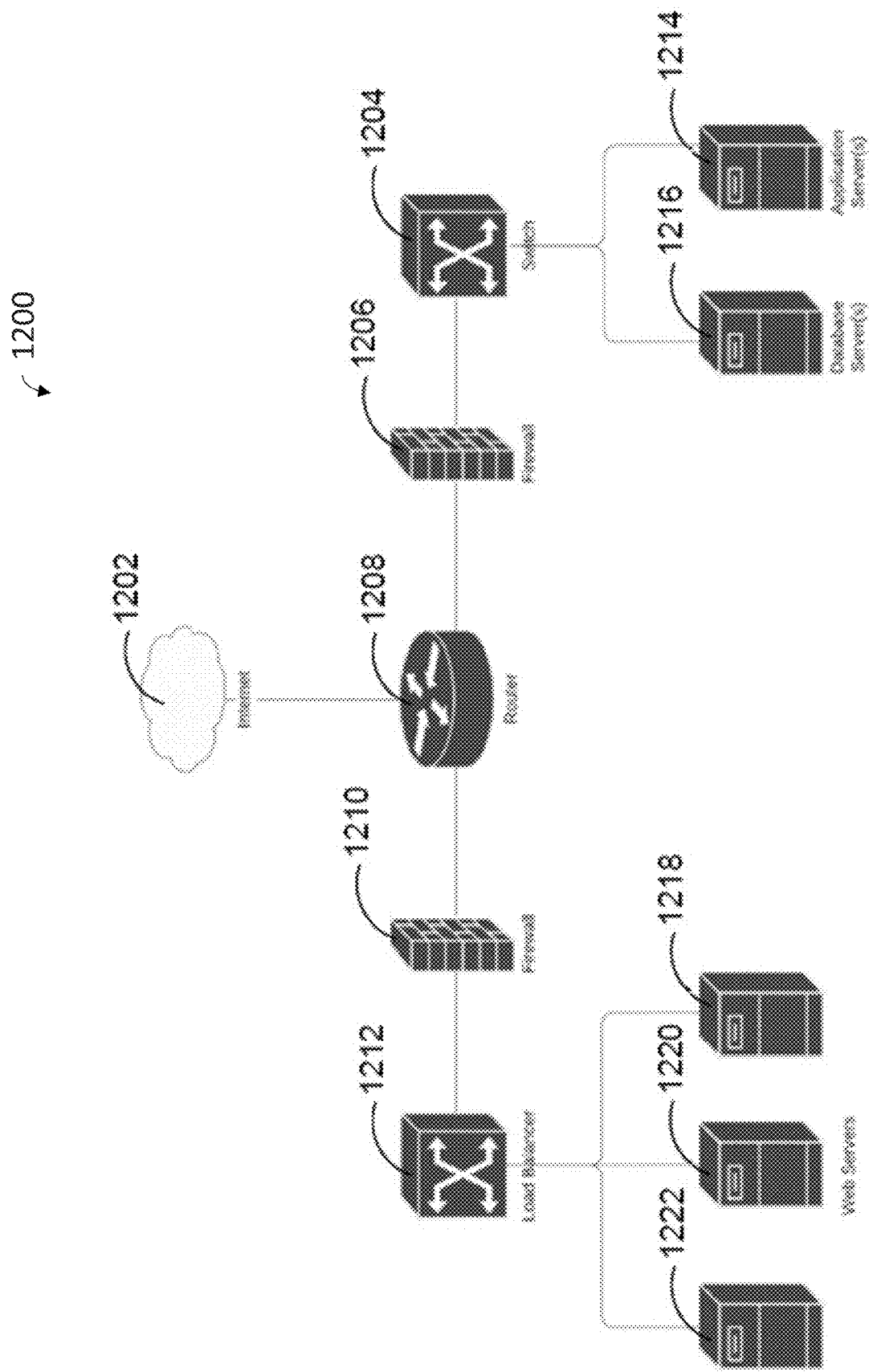
FIG. 12 is a computer network diagram for processing and sending data and traffic of the present disclosure according to an embodiment.

FIG. 12 is a computer network diagram 1200 for processing and sending data and traffic of the present disclosure according to an embodiment. The computer network diagram 1200 includes a router 1208 connected to a load balancer 1212 and a switch 1204, each connected to the router 1208 through a firewall, 1210 and 1206 respectively. The load balancer 1212 is further connected to one or more web servers 1218, 1220, and 1222, and the switch 1204 is further connected to one or more database servers 1216 and one or more application servers 1214.

Figure 13:
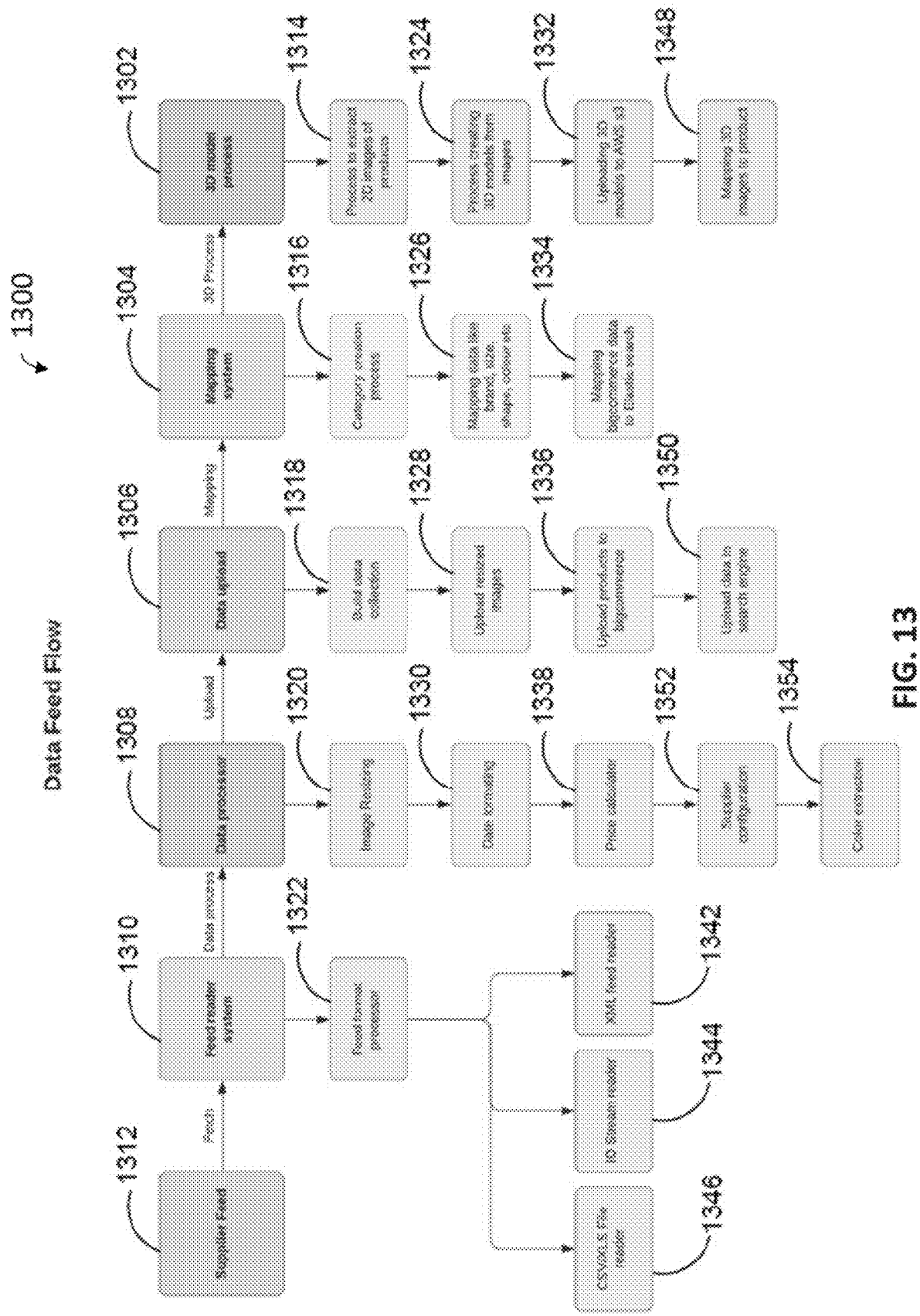
FIG. 13 is a flow diagram illustrating the data input into the system from different mills and supplier systems, and a workflow sequence according to an embodiment.

FIG. 13 is a flow diagram 1300 illustrating the data input into the system from different mills and supplier systems, and a workflow sequence according to an embodiment. The flow diagram 1300 shows a supplier feed 1312 that fetches from a feed reader system 1310, which processes data through a data processor 1308. The data processor 1308 uploads to a data upload 1306. Mapping is then performed by a mapping system 1304 and a 3D model process is performed 1302.

Data flows from the feed reader system 1310 to a feed format processor 1322 and further to a CSV/XLS file reader 1346, an IO stream reader 1344, and an XML feed reader 1342. Data flows from the data processor 1308 to image resizing 1320, date formatting 1330, price calculator 1338, supplier configuration 1352, and color extraction 1354. Data flows from data upload 1306 to build data collection 1318, uploaded resized images 1328, upload products to bigcommerce 1336, and upload data to search engine 1350. Data flows from the mapping system 1304 to category creation process 1316, mapping data, such as brand, size, shape, color, etc. 1326, and mapping bigcommerce data to elasticsearch 1334. Data flows from 3D model process 1302 to process to extract 2D images of products 1314, process creating 3D models from images 1324, uploading 3D models to AWS S3, and mapping 3D images to product 1348.

Figure 14:
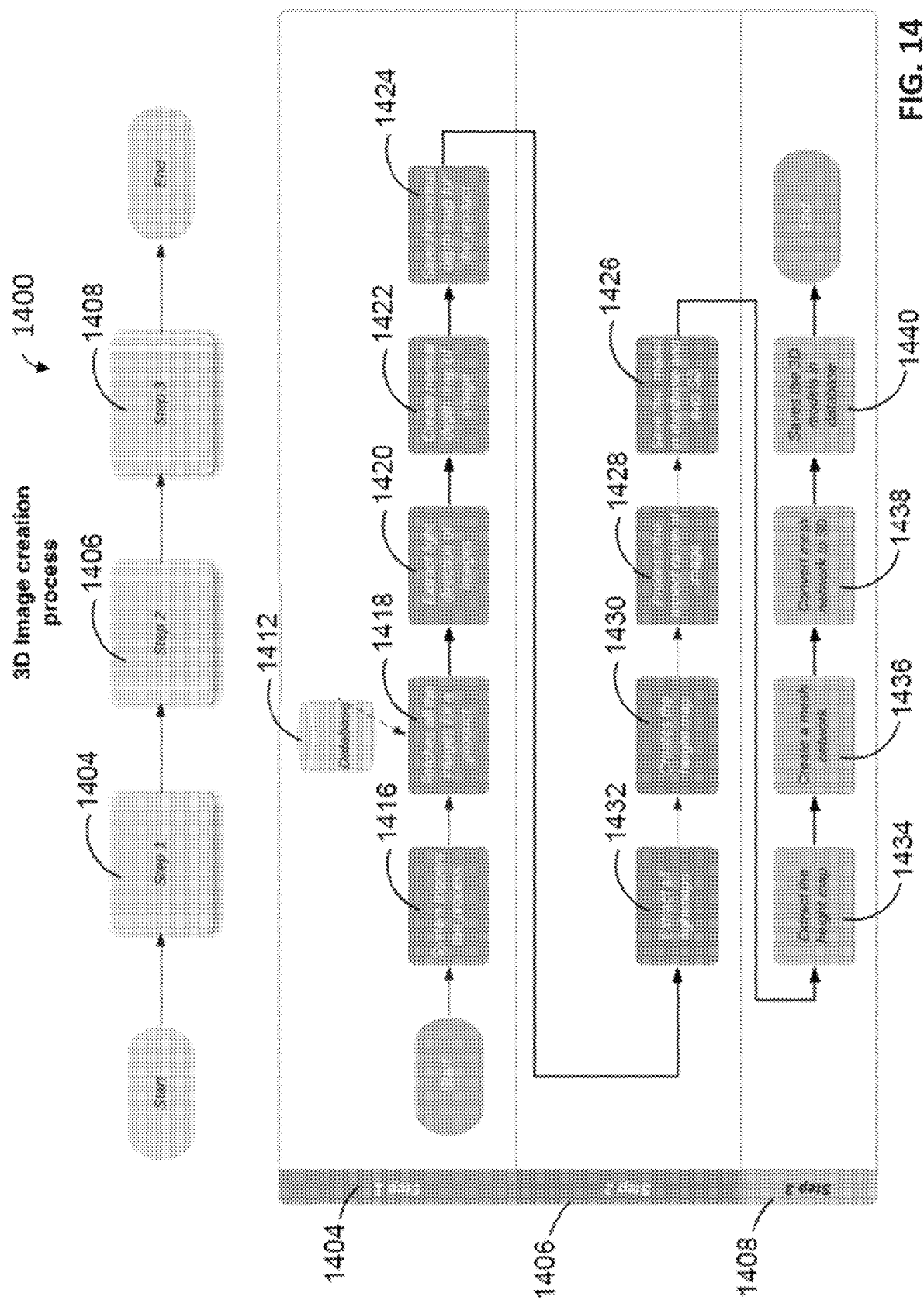
FIG. 14 is a flow diagram illustrating the workflow of creating a 3D model of a 2D image of a product according to an embodiment.

FIG. 14 is a flow diagram 1400 illustrating the workflow of creating a 3D model of a 2D image of a product to be used in the present disclosure according to an embodiment. The 3D image creation process includes Step 1 1401, Step 2 1406, and Step 3 1408. Step 1 1404 begins at step 1416, where a system triggers the process. At step 1418, all the images of a product are fetched from a database 1412. The light direction of the images is extracted at step 1420, a normal depth map of the image is created at 1422, and the normal depth map for the product is saved at step 1424.

Step 2 continues by extracting all lightmaps at step 1432, creating the height map at step 1430, processing the aspect ratio of the image at step 1428, and saving the model in database and AWS S3 at step 1426. Step 3 continues by extracting the height map at step 1434, creating a mesh network at step 1436, converting a mesh network to 3D at step 1438, and saving the 3D models in the database at step 1440.

Figure 15:
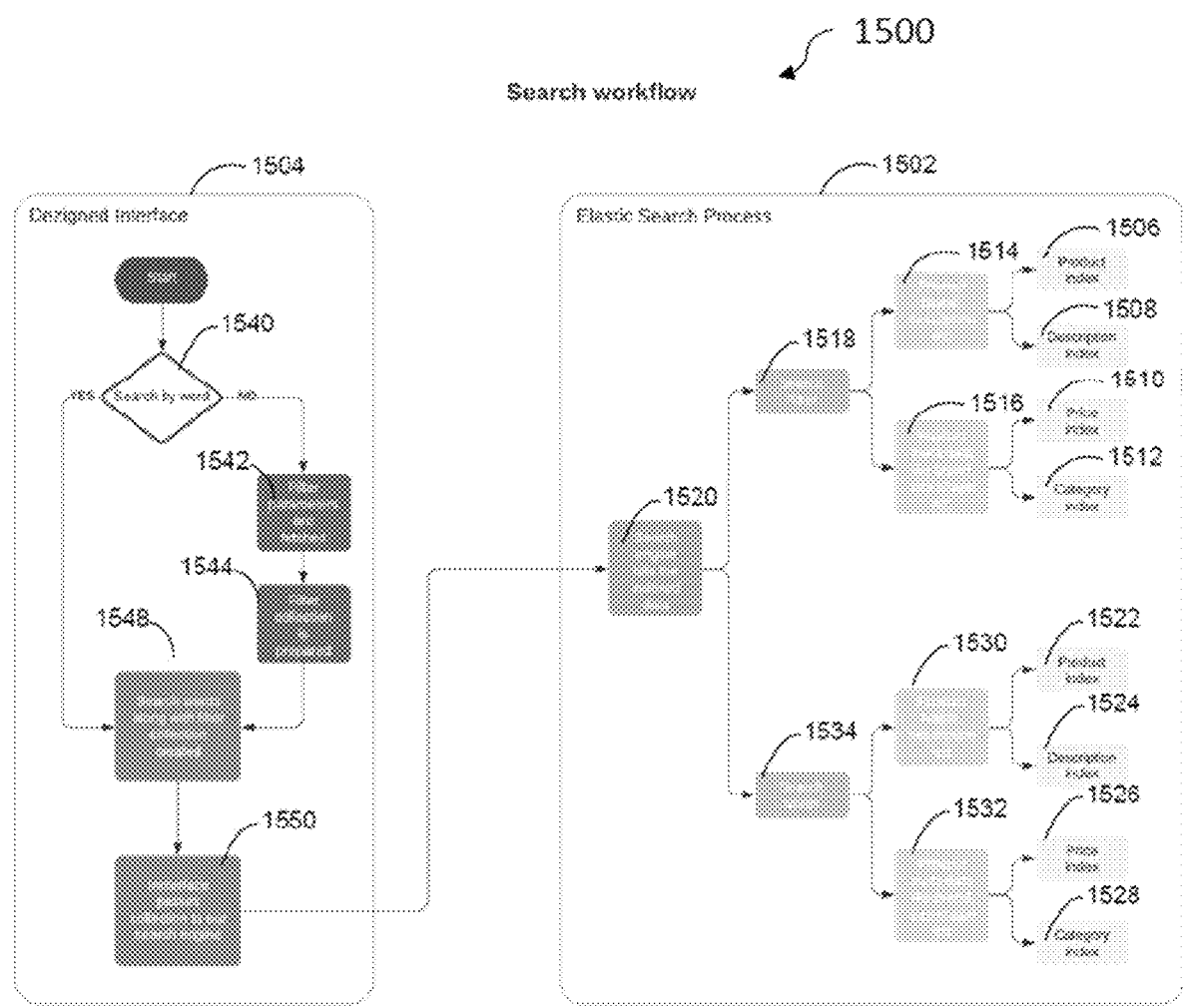
FIG. 15 is a flow diagram of the search process according to an embodiment.

FIG. 15 is a flow diagram 1500 of the search process of the present disclosure according to an embodiment. The flow diagram 1500 shows a search workflow comprised of the Dezigned interface 1504 and the Elasticsearch process 1502. The Dezigned interface 1504 determines if a search by word is performed at step 1540. If not, filter parameters are fetched at step 1542, and a filter collection is prepared at step 1544. Control continues at step 1548. If yes, control passes to step 1548. At step 1548 search words along with filter collection is created at step 1548. The interface then passes collection to the search engine at step 1550. Control is then passed to step 1520.

The Elasticsearch process 1502 beings with step 1520. At step 1520 the search engine hits the indexed data. From step 1520 controls passes to steps 1518 search filter and/or step 1534 search words. From step 1518 control passes to step 1514 product name, description, etc. and/or step 1516 product metadata, such as brand, size, shape, etc. From step 1514 control is passed to step 1506 product index and or description index. From step 1516 control is passed to step 1510 price index and/or category index 1512. From step 1534 control passes to step 1530 product name, description, etc. and or step 1532 product metadata, such as brand, size, shape, etc. From step 1530 control is passed to step 1522 product index and/or step 1524 description index. From step 152 control is passed to step 1526 price index and/or step 1528 category index.

Figure 16:
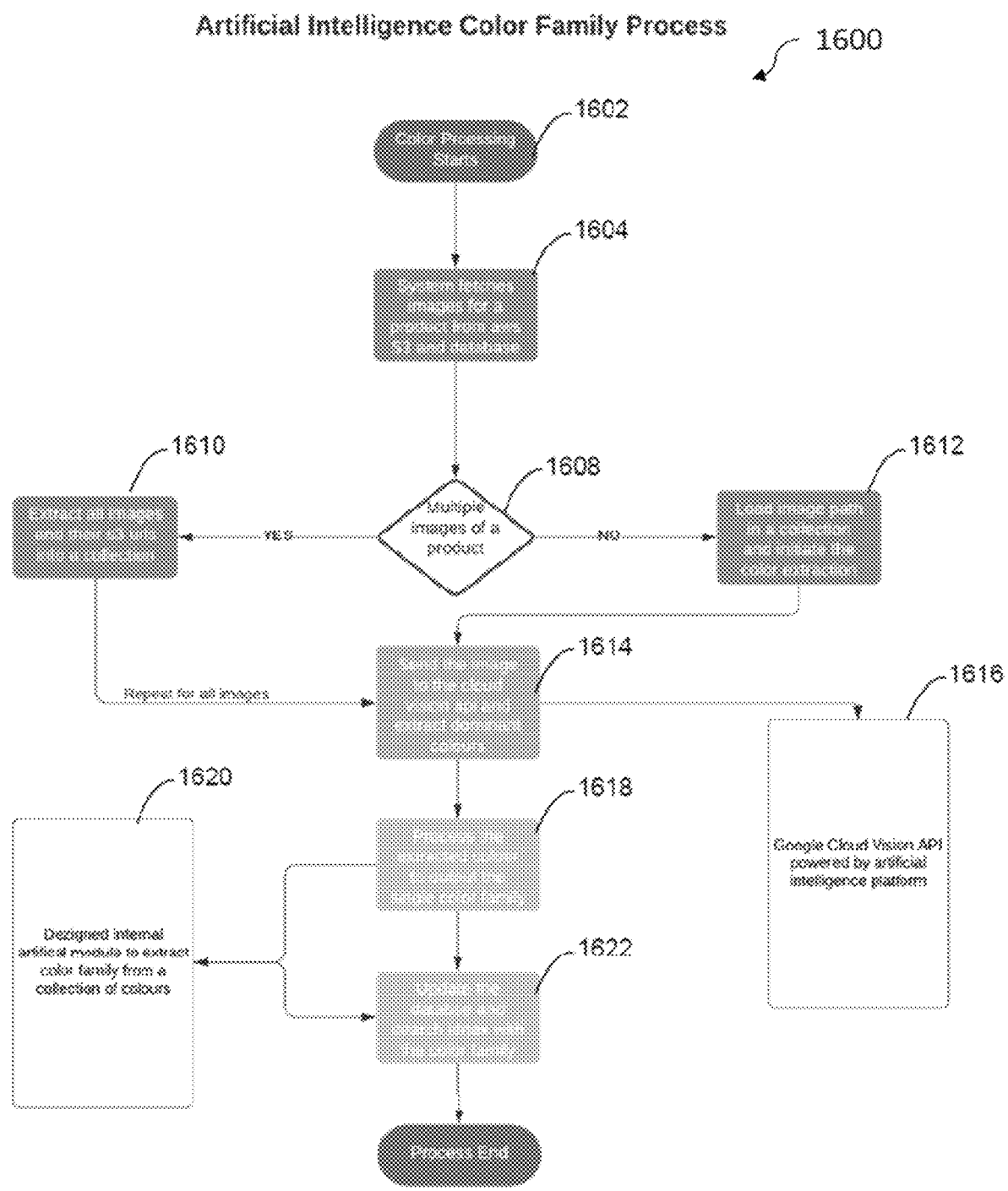
FIG. 16 is a flow diagram of the process to extract a color family from a multi-colored image of a product using AI according to an embodiment.

FIG. 16 is a flow diagram of the process to extract a color family from a multi-colored image of a product using AI according to an embodiment. At step 1602, color processing starts. At step 1604, the system fetches images for a product from AWS S3 and a database. At step 1608, it is determined if there are multiple images of a product. If yes, all images and their S3 URLs are extracted into a collection at step 1610, and control passes to step 1614. If no, the image path in a collection is loaded and color extraction is initiated at step 1612, and control passes to step 1614. At step 1614, the image is sent to the cloud vision API and dominant colors are extracted (Google Cloud Vision API powered by artificial intelligence platform 1616). At step 1618, the extracted color is processed to output a single color family (Dezigned internal artificial module to extract color family from a collection of colors 1620). At step 1622, the database and the search index are updated with the color family, and the process ends.

Systems, apparatuses, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using computers operating in a client-server relationship. Typically, in such a system, the client computers are located remotely from the server computer and interact via a network. The client-server relationship may be defined and controlled by computer programs running on the respective client and server computers.

Systems, apparatus, and methods described herein may be implemented within a network-based cloud computing system. In such a network-based cloud computing system, a server or another processor that is connected to a network communicates with one or more client computers via a network. A client computer may communicate with the server via a network browser application residing and operating on the client computer, for example. A client computer may store data on the server and access the data via the network. A client computer may transmit requests for data, or requests for online services, to the server via the network. The server may perform requested services and provide data to the client computer(s). The server may also transmit data adapted to cause a client computer to perform a specified function, e.g., to perform a calculation, to display specified data on a screen, etc. For example, the server may transmit a request adapted to cause a client computer to perform one or more of the steps or functions of the methods and workflows described herein, including one or more of the steps or functions described herein. Certain steps or functions of the methods and workflows described herein, may be performed by a server or by another processor in a network-based cloud-computing system. Certain steps or functions of the methods and workflows described herein may be performed by a client computer in a network-based cloud computing system. The steps or functions of the methods and workflows described herein may be performed by a server and/or by a client computer in a network-based cloud computing system, in any combination.

Systems, apparatus, and methods described herein may be implemented using a computer program product tangibly embodied in an information carrier, e.g., in a non-transitory machine-readable storage device, for execution by a programmable processor; and the method and workflow steps described herein may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 17:
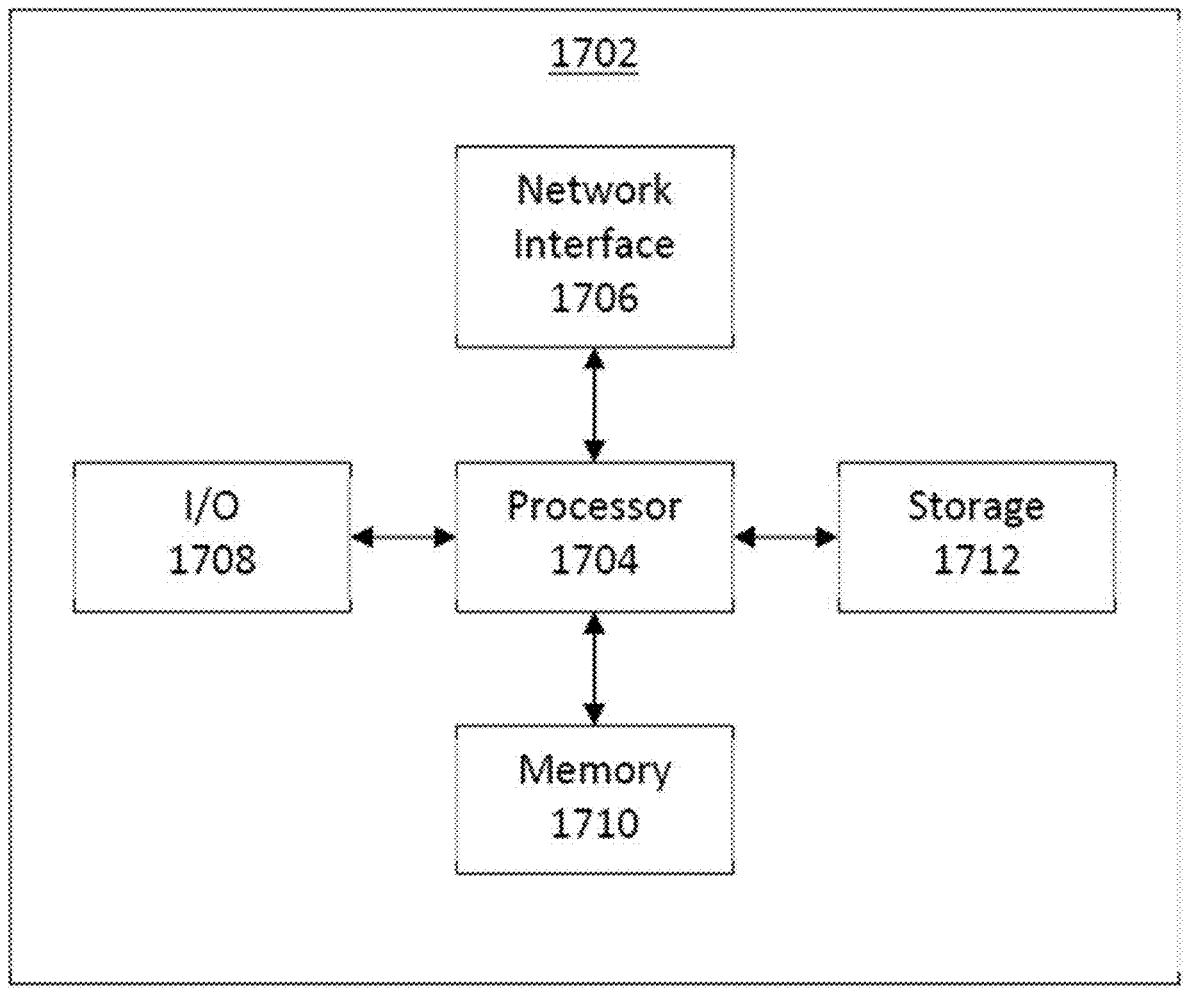
FIG. 17 is a high-level block diagram of a computer that may be used to implement one or more embodiments.

A high-level block diagram of an example computer 1702 that may be used to implement systems, apparatus, and methods described herein is depicted in FIG. 17. Computer 1702 includes a processor 1704 operatively coupled to a data storage device 1712 and a memory 1710. Processor 1704 controls the overall operation of computer 1702 by executing computer program instructions that define such operations. The computer program instructions may be stored in data storage device 1712, or other computer readable medium, and loaded into memory 1710 when execution of the computer program instructions is desired. Thus, the method and workflow steps or functions described herein can be defined by the computer program instructions stored in memory 1710 and/or data storage device 1712 and controlled by processor 1704 executing the computer program instructions. For example, the computer program instructions can be implemented as computer executable code programmed by one skilled in the art to perform the method and workflow steps or functions described herein. Accordingly, by executing the computer program instructions, the processor 1704 executes the method and workflow steps or functions described herein. Computer 1702 may also include one or more network interfaces 1706 for communicating with other devices via a network. Computer 1702 may also include one or more input/output devices 1708 that enable user interaction with computer 1702 (e.g., display, keyboard, mouse, speakers, buttons, etc.).

Processor 1704 may include both general and special purpose microprocessors, and may be the sole processor or one of multiple processors of computer 1702. Processor 1704 may include one or more central processing units (CPUs), for example. Processor 1704, data storage device 1712, and/or memory 1710 may include, be supplemented by, or incorporated in, one or more application-specific integrated circuits (ASICs) and/or one or more field programmable gate arrays (FPGAs).

Data storage device 1712 and memory 1710 each include a tangible non-transitory computer readable storage medium. Data storage device 1712, and memory 1710, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 1708 may include peripherals, such as a printer, scanner, display screen, etc. For example, input/output devices 1708 may include a display device such as a cathode ray tube (CRT) or liquid crystal display (LCD) monitor for displaying information to the user, a keyboard, and a pointing device such as a mouse or a trackball by which the user can provide input to computer 1702.

Any or all of the systems and apparatus discussed herein may be implemented using one or more computers such as computer 1702.

One skilled in the art will recognize that an implementation of an actual computer or computer system may have other structures and may contain other components as well, and that FIG. 17 is a high level representation of some of the components of such a computer for illustrative purposes.

As used herein, the term "connected to" includes "in communication with", and "in communication with" includes "connected to."

The foregoing Detailed Description is to be understood as being in every respect illustrative and exemplary, but not restrictive. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A computer implemented method comprising:
  receiving, by at least one processor, a search query for a first design product from a user;
    wherein the search query comprises a 2D digital representation of at least one material associated with the first design product;
  extracting, by the at least one processor, from the 2D digital representation, at least:
    a plurality of light direction views and
    a plurality of colors;
  generating, by the at least one processor, based on the plurality of light direction views, a virtual normal map of the 2D digital representation;
  converting, by the at least one processor, the virtual normal map of the 2D digital representation into a heightmap of the 2D digital representation while maintaining an aspect ratio;
  generating, by the at least one processor, based on the heightmap of the 2D digital representation, a 3D model of the first design product;
  clustering, by the at least one processor, based on at least one artificial intelligence model, the plurality of colors into at least one search color family that is representative of at least one color of the first design product;
  searching, by the at least one processor, a database, based on at least one search color family and the 3D model of the first design product, using an artificial intelligence search, to identify at least one other particular design product related to the first design product;
    wherein the database comprises a plurality of indexed design products records that corresponds to a plurality of design products;
    wherein each indexed design product record is indexed in the database according to at least one indexed color family;
    wherein the at least one indexed color family of each indexed design product is determined by:
      extracting a plurality of indexed colors from each indexed design product;
      clustering, using the at least one artificial intelligence model, the plurality of indexed colors into the at least one indexed color family representative of a color of each indexed design product;
    wherein the searching the database comprises querying the plurality of indexed design products records associated with the at least one indexed color family based on the at least one search color family that corresponds to the at least one indexed color family; and
  instructing, by the at least one processor, to display a 3D model of the at least one other particular design product, by itself or together with the 3D model of the first design product in a projection of a project area that is shown on a screen of a computing device of a user.

2. The computer implemented method of claim 1, wherein the plurality of indexed design products records is from multiple sources.

3. The computer implemented method of claim 1, further comprising:
  filtering, by the at least one processor, when the searching identifies a plurality of other particular design products, the plurality of other particular design products based on category sets.

4. The computer implemented method of claim 3, wherein the category sets comprise at least one of: shape, size, material, color, or brand.

5. The computer implemented method of claim 1, further comprising:
creating, by the at least one processor, when the searching identifies a plurality of other particular design products, a collection of project ideas using at least one selected design product selected from the plurality of other particular design products.

6. The computer implemented method of claim 1, wherein the 3D model of the at least one other particular design product is displayed in the projection of the project area using augmented reality and computer vision rendering algorithms.

7. The computer implemented method of claim 1, wherein each of the first design product and the at least one other particular design product is at least one of: carpeting, area rugs, vinyl plank flooring, furniture, hardwood flooring, hardwood refinishing, wallpaper, fabric, lighting, window treatments, pillows, tile, countertop, accessory, or any combination thereof.

8. The computer implemented method of claim 1, further comprising:
matching, by the at least one processor, the user with at least one service provider that installs at least one of the first design product and the at least one other particular design product based on geographic proximity.

9. The computer implemented method of claim 8, further comprising:
scheduling, by the at least one processor, at least one appointment for the at least one service provider to install at least one of the first design product and the at least one other particular design product using an online calendar based on service provider availability; and
updating, by the at least one processor, the online calendar of the at least one service provider automatically.

10. The computer implemented method of claim 9, further comprising:
generating, by the at least one processor, a notification when the at least one service provider is present on an installation site based on a GPS positioning of a service provider device.

11. The computer implemented method of claim 8, further comprising:
estimating a cost of a project based on a cost of the at least one other particular design product and a cost for a selected service provider to install the at least one other particular design product.

12. The computer implemented method of claim 1, further comprising:
instructing, by the at least one processor, a camera to scan the project area to obtain a captured image;
determining dimensions of the project area based on the captured image; and
automatically extracting, by the at least one processor, positions of current items and walls within the project area.

13. An apparatus for providing an interior design toolset, the apparatus comprising:
a processor, for executing computer program instructions stored in a memory, which when executed by the processor, cause the processor to perform operations comprising:
receiving a search query for a first design product from a user;
wherein the search query comprises a 2D digital representation of at least one material associated with the first design product;
extracting from the 2D digital representation, at least:
a plurality of light direction views and
a plurality of colors;
generating, based on the plurality of light direction views, a virtual normal map of the 2D digital representation;
converting the virtual normal map of the 2D digital representation into a heightmap of the 2D digital representation while maintaining an aspect ratio;
generating, based on the heightmap of the 2D digital representation, a 3D model of the first design product;
clustering, based on at least one artificial intelligence model, the plurality of colors into at least one search color family that is representative of at least one color of the first design product;
searching a database, based on at least one search color family and the 3D model of the first design product, using an artificial intelligence search, to identify at least one other particular design product related to the first design product;
wherein the database comprises a plurality of indexed design products records that corresponds to a plurality of design products;
wherein each indexed design product record is indexed in the database according to at least one indexed color family;
wherein the at least one indexed color family of each indexed design product is determined by:
extracting a plurality of indexed colors from each indexed design product;
clustering, using the at least one artificial intelligence model, the plurality of indexed colors into the at least one indexed color family representative of a color of each indexed design product;
wherein the searching the database comprises querying the plurality of indexed design products records associated with the at least one indexed color family based on the at least one search color family that corresponds to the at least one indexed color family; and
instructing to display a 3D model of the at least one other particular design product, by itself or together with the 3D model of the first design product in a projection of a project area that is shown on a screen of a computing device of a user.

14. The apparatus of claim 13, wherein the operations further comprise:
estimating a cost of a project based on a cost of the at least one other particular design product and a cost for a selected service provider to install the at least one other particular design product.

15. The apparatus of claim 13, wherein the operations further comprise:
instructing a camera to scan the project area to obtain a captured image;
determining dimensions of the project area based on the captured image; and
automatically extracting positions of current items and walls within the project area.

16. A non-transitory computer readable medium storing computer program instructions, the computer program instructions when executed by a processor cause the processor to perform operations comprising:
    receiving a search query for a first design product from a user;
        wherein the search query comprises a 2D digital representation of at least one material associated with the first design product;
    extracting, from the 2D digital representation, at least:
        a plurality of light direction views and
        a plurality of colors;
    generating, based on the plurality of light direction views, a virtual normal map of the 2D digital representation;
    converting the virtual normal map of the 2D digital representation into a heightmap of the 2D digital representation while maintaining an aspect ratio;
    generating, based on the heightmap of the 2D digital representation, a 3D model of the first design product;
    clustering, based on at least one artificial intelligence model, the plurality of colors into at least one search color family that is representative of at least one color of the first design product;
    searching a database, based on at least one search color family and the 3D model of the first design product, using an artificial intelligence search, to identify at least one other particular design product related to the first design product;
        wherein the database comprises a plurality of indexed design products records that corresponds to a plurality of design products;
        wherein each indexed design product record is indexed in the database according to at least one indexed color family;
        wherein the at least one indexed color family of each indexed design product is determined by:
            extracting a plurality of indexed colors from each indexed design product;
            clustering, using the at least one artificial intelligence model, the plurality of indexed colors into the at least one indexed color family representative of a color of each indexed design product;
        wherein the searching the database comprises querying the plurality of indexed design products records associated with the at least one indexed color family based on the at least one search color family that corresponds to the at least one indexed color family; and
    instructing to display a 3D model of the at least one other particular design product, by itself or together with the 3D model of the first design product in a projection of a project area that is shown on a screen of a computing device of a user.

17. The non-transitory computer readable medium of claim 16, wherein the operations further comprise:
    estimating a cost of a project based on a cost of the at least one other particular design product and a cost for a selected service provider to install the at least one other particular design product.

18. The non-transitory computer readable medium of claim 16, wherein the operations further comprise:
    instructing a camera to scan the project area to obtain a captured image;
    determining dimensions of the project area based on the captured image; and
    automatically extracting positions of current items and walls within the project area.

19. The non-transitory computer readable medium of claim 16, wherein the operations further comprise:
    matching the user with at least one service provider that installs at least one of the first design product and the at least one other particular design product based on geographic proximity.

* * * * *